United States Patent
Takeda

(10) Patent No.: US 12,189,125 B2
(45) Date of Patent: Jan. 7, 2025

(54) VIRTUAL IMAGE DISPLAY DEVICE AND OPTICAL UNIT

(71) Applicant: SEIKO EPSON CORPORATION, Tokyo (JP)

(72) Inventor: Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 650 days.

(21) Appl. No.: 17/458,937

(22) Filed: Aug. 27, 2021

(65) Prior Publication Data

US 2022/0066217 A1 Mar. 3, 2022

(30) Foreign Application Priority Data

Aug. 28, 2020 (JP) ................. 2020-144250

(51) Int. Cl.
*G02B 27/01* (2006.01)
*G02B 27/09* (2006.01)

(52) U.S. Cl.
CPC ..... *G02B 27/0172* (2013.01); *G02B 27/0983* (2013.01); *G02B 2027/013* (2013.01); *G02B 2027/0174* (2013.01)

(58) Field of Classification Search
CPC ............ G02B 27/0172; G02B 27/0983; G02B 2027/013; G02B 2027/0174
See application file for complete search history.

(56) References Cited

U.S. PATENT DOCUMENTS

2017/0045746 A1\* 2/2017 Ellsworth .......... G02B 27/0176
2020/0018966 A1 1/2020 Komatsu et al.

FOREIGN PATENT DOCUMENTS

| CN | 111123526 A | * | 5/2020 |
| CN | 210982912 U | * | 7/2020 |
| JP | H06-059217 A | | 3/1994 |
| JP | 2016-085427 A | | 5/2016 |
| JP | 2020-008749 A | | 1/2020 |

OTHER PUBLICATIONS

Translation of CN111123526 (Year: 2024).*
Translation of CN 210982912 (Year: 2024).*

\* cited by examiner

*Primary Examiner* — Jerry L Brooks
(74) *Attorney, Agent, or Firm* — Oliff PLC

(57) ABSTRACT

A virtual image display device includes an image generation device, and a concave transmissive mirror configured to reflect image light emitted from the image generation device. A light superimposer is provided on an external side of a partial reflective film provided in the concave transmissive mirror, the light superimposer being configured to superimpose additional light in a visible range on image light transmitted through the partial reflective film.

17 Claims, 22 Drawing Sheets

VIRTUAL IMAGE DISPLAY DEVICE AND OPTICAL UNIT

The present application is based on, and claims priority from JP Application Serial Number 2020-144250, filed Aug. 28, 2020, the disclosure of which is hereby incorporated by reference herein in its entirety.

BACKGROUND

1. Technical Field

The present disclosure relates to a virtual image display device and an optical unit of a see-through type, and particularly to a virtual image display device and an optical unit of a type in which image light is caused to impinge on a concave transmissive mirror and reflection light from the concave transmissive mirror is observed.

2. Related Art

As a virtual image display device including a concave transmissive mirror, a device including a prism member in which a transmissive reflective surface is incorporated is known, for example (see JP-A-2020-008749). It is disclosed that in this device, image light incident on the prism member is guided by totally reflecting it at a total reflection surface of the prism member toward the transmissive reflective surface, and the image light is reflected by the transmissive reflective surface toward the concave transmissive mirror disposed in front of the prism member.

In the virtual image display device disclosed in JP-A-2020-008749, the image light is emitted in the front direction, and as such the image being displayed can be disadvantageously seen from the outside.

SUMMARY

A virtual image display device in one specific aspect of the present disclosure includes an image generation device, and a concave transmissive mirror configured to reflect image light emitted from the image generation device. A light superimposer is provided on an external side of a partial reflective film provided in the concave transmissive mirror, the light superimposer being configured to superimpose additional light in a visible range on image light transmitted through the partial reflective film.

BRIEF DESCRIPTION OF THE DRAWINGS

FIG. 7 is a partially enlarged side sectional view for describing a structure and a function of a shade element and the like.

FIG. 9 is a partially enlarged side sectional view for describing a structure and a function of a concave transmissive mirror and the like.

DESCRIPTION OF EXEMPLARY EMBODIMENTS

First Embodiment

With respect to FIGS. 1 to 4 and the like, a virtual image display device and an optical unit incorporated in the virtual image display device according to a first embodiment of the present disclosure are described below.

Figure 1:
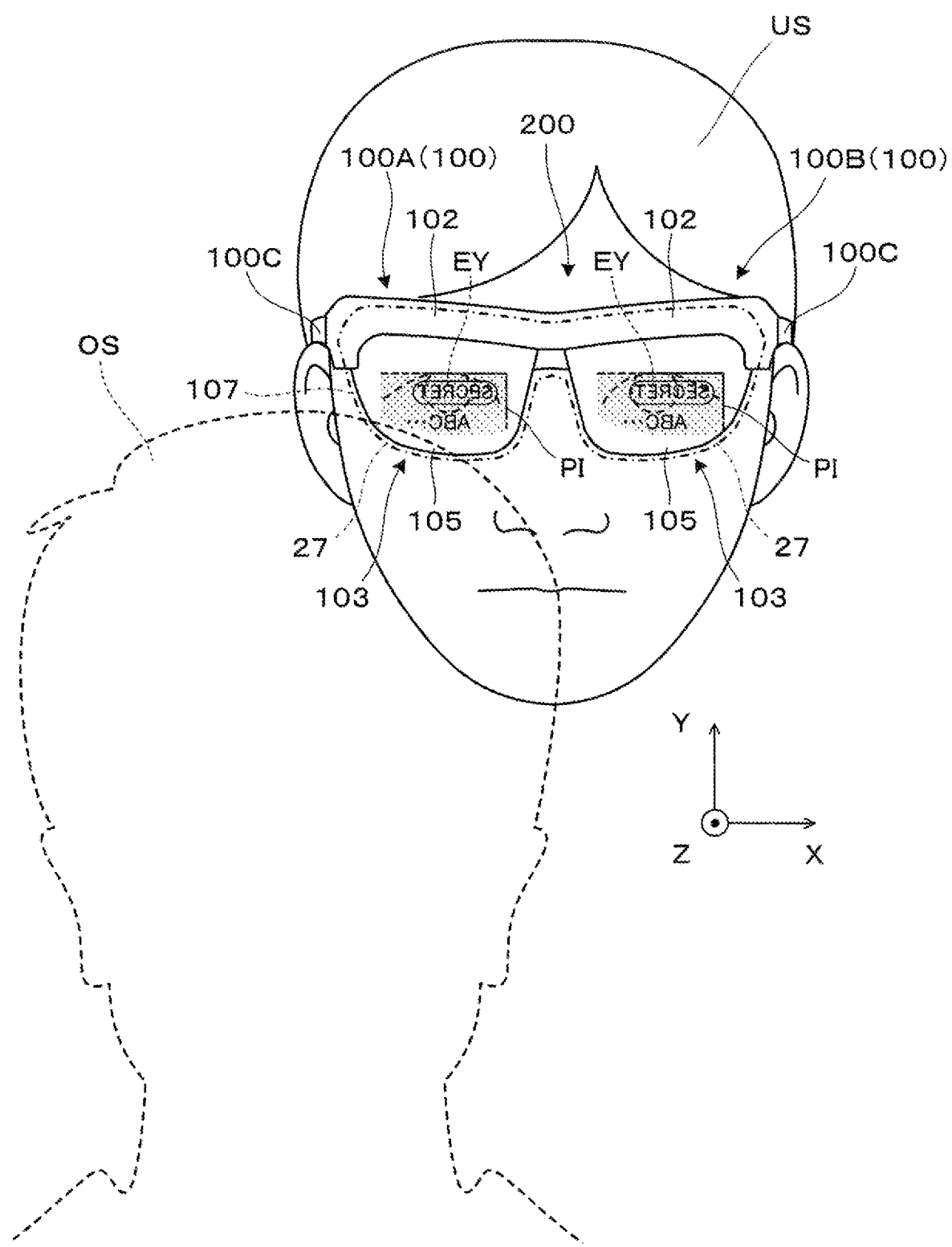
FIG. 1 is an external appearance view for describing a wearing state of a virtual image display device of a first embodiment.

FIG. 1 is a drawing for describing a wearing state of a head-mounted display (hereinafter referred also to as HMD) 200, and the HMD 200 makes a viewer or wearer US wearing it recognize an image as a virtual image. In FIG. 1 and the like, X, Y, and Z are an orthogonal coordinate system, the +X direction corresponds to the lateral direction in which eyes EY of the viewer or wearer US wearing the HMD 200 or a virtual image display device 100 are located, the +Y direction corresponds to the upward direction, for the wearer US, orthogonal to the lateral direction in which the eyes EY are located, and the +Z direction corresponds to the forward direction or the front direction for the wearer US. The ±Y direction is parallel with the vertical axis or the vertical direction.

The HMD 200 includes a right-eye first display device 100A, a left-eye second display device 100B, and a pair of temple-shaped support devices 100C that supports the display devices 100A and 100B. The first display device 100A is composed of a display driving part 102 disposed in the upper part and a cover 103 that covers the front side of the eye. Likewise, the second display device 100B is composed of the display driving part 102 disposed in the upper part and the cover 103 that covers the front side of the eye. The cover 103 is an eyeglass-lens shaped optical element 105. When a shade 107 illustrated with the dashed line is attached, the cover 103 has a two-layer structure including an eyeglass-lens shaped shade element 27 constituting the shade 107. The support device 100C supports the upper end side of the optical element 105 through the display driving part 102. The shade 107 is detachably fixed to the display driving part 102. The first display device 100A and the second display device 100B are devices that are optically reversed left and right, and therefore the right-eye first display device 100A is described as a representative of the virtual image display device 100.

Figure 2:
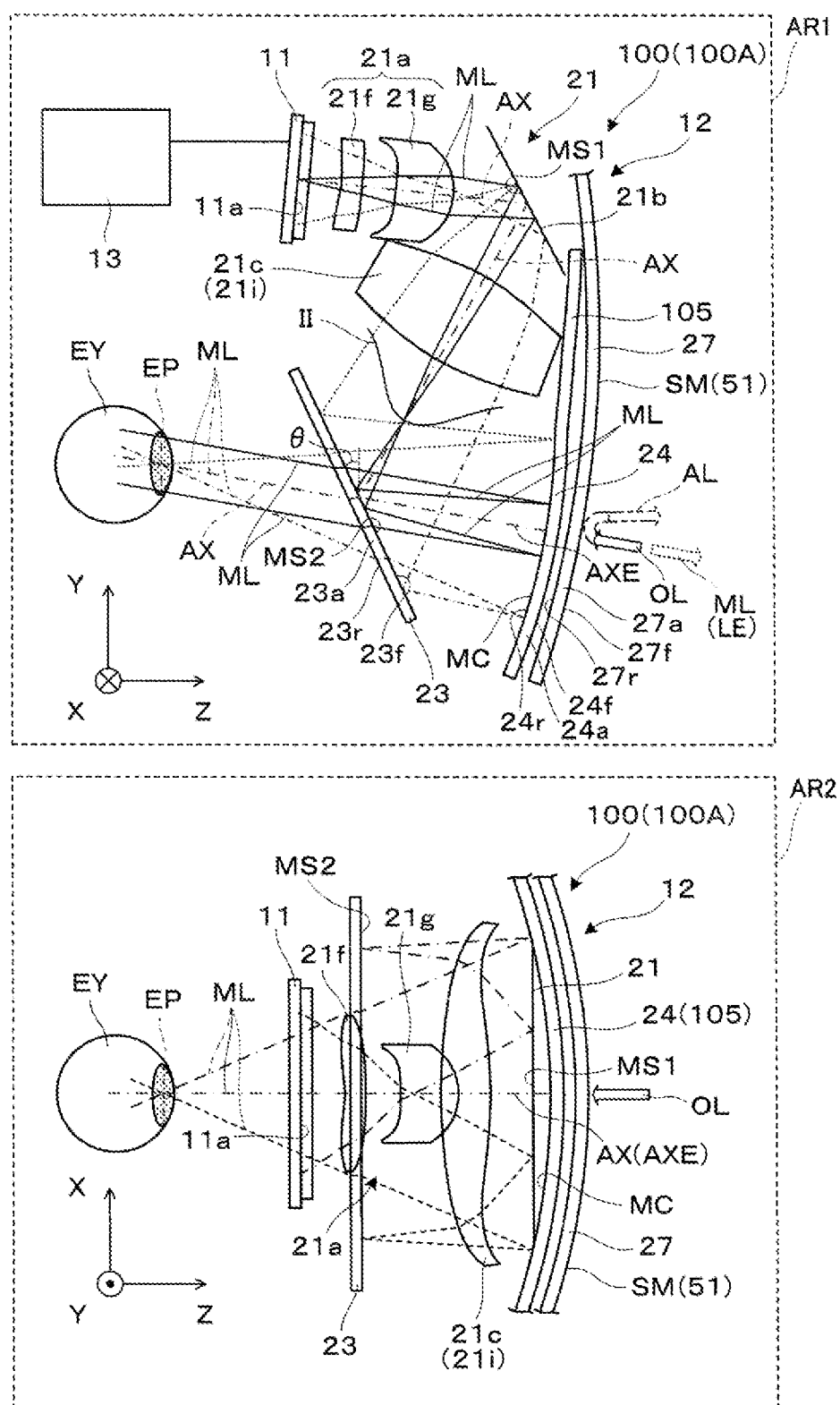
FIG. 2 is a side sectional view and a partial sectional plan view for describing the virtual image display device of FIG. 1.
Figure 3:
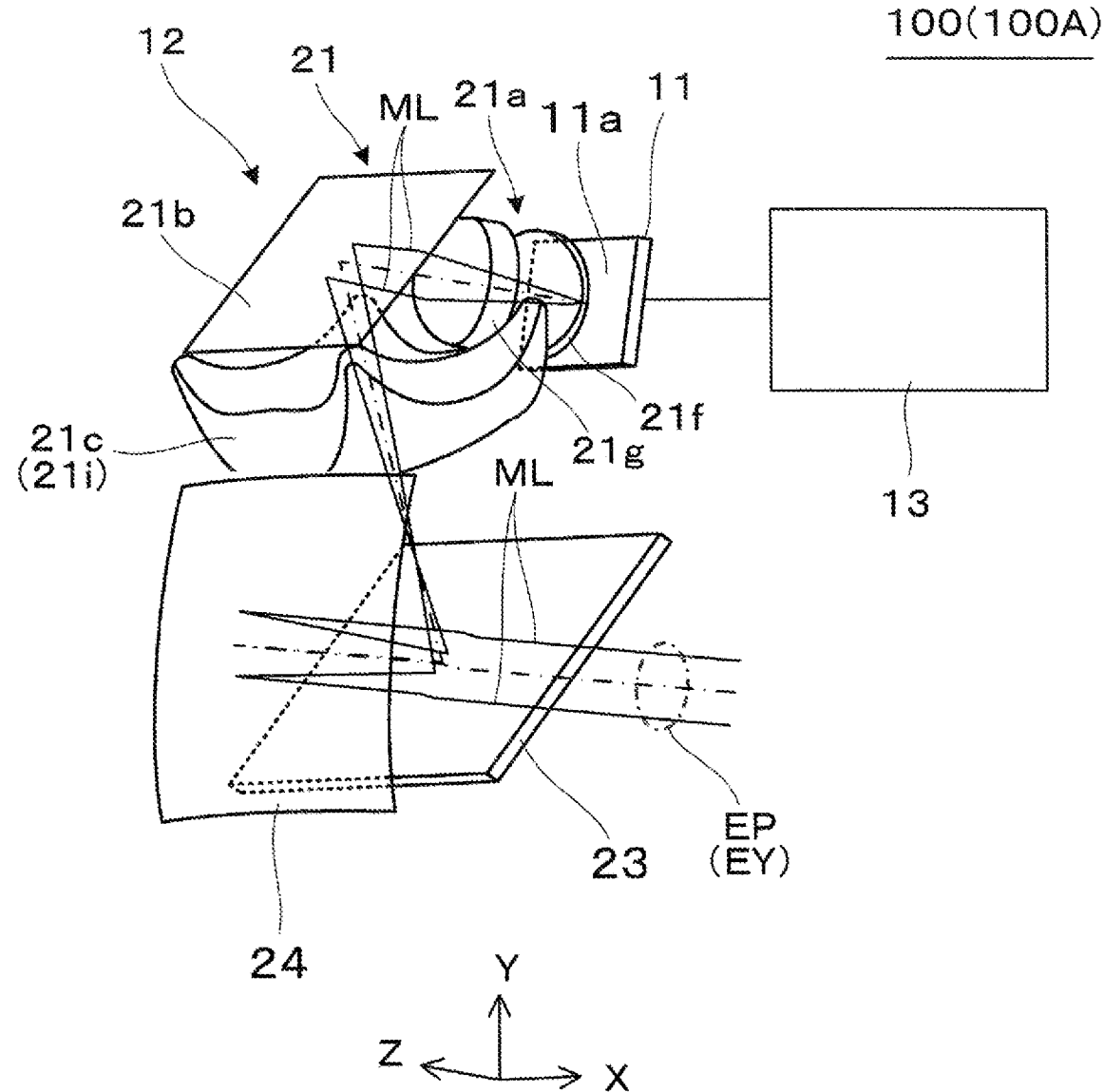
FIG. 3 is a schematic perspective view for describing the virtual image display device of FIG. 1.

FIG. 2 is a sectional view for describing the virtual image display device 100 that is the right-eye display device 100A, and FIG. 3 is a perspective view for describing the virtual image display device 100. In FIG. 2, a first region AR1 is a side sectional view of the virtual image display device 100, and a second region AR2 is a plan view illustrating a partial cross section along the light paths of the virtual image display device 100.

The virtual image display device 100 includes an image generation part 11, an optical unit 12 and a display control circuit 13. It should be noted that in this specification, a configuration in which the display control circuit 13 is removed or a configuration in which the shade element 27 is removed in the optical unit 12 is also referred to as the virtual image display device 100 from the viewpoint of achieving an optically function. The display control circuit 13 and a part of the optical unit 12 are held in the outer frame of the display driving part 102 illustrated in FIG. 1.

The image generation part 11 is a self-emitting display device. The image generation part 11 is, for example, a micro LED display, and forms a color still image or a moving image on a two-dimensional display surface 11a. The image generation part 11 is driven by the display control circuit 13 to perform a display operation. The image generation part 11 is not limited to a micro LED display, and may be replaced by a display device using an organic electroluminescence (EL), an inorganic EL, an organic LED, a laser array, a quantum dot light emitting element or the like. In this specification, the image generation part 11 is referred to also as an image light generation device. The image generation part 11 is not limited to a self-emitting image generation part, and may be a unit composed of an LCD or other light modulation elements and configured to form an image by illuminating the light modulation element using a light source such as a backlight. As the image generation part 11, a liquid crystal on silicon (LCoS (registered trademark)), a digital micro mirror device or the like may be used in place of an LCD. It is to be noted that in the case where the image generation part 11 is a part that is illuminated by a light source like a light modulation element, the light modulation element is referred to as an image generation part and the entirety including the light source is referred to as an image generation device.

The optical unit 12 includes a projection optical system 21, a transmissive tilted mirror 23 and a concave transmissive mirror 24. The optical unit 12 includes the shade element 27 as a detachable element. In the optical unit 12, the light path from the image generation part 11 to the projection optical system 21 is disposed on the upper side of the transmissive tilted mirror 23. More specifically, the image generation part 11 and the projection optical system 21 are disposed in a space sandwiched by a tilted plane extended from the transmissive tilted mirror 23 and a vertical plane extended upward from the upper end of the concave transmissive mirror 24.

The projection optical system 21 is held in the outer frame of the display driving part 102 illustrated in FIG. 1, and projects an image light ML emitted from the image generation part 11. The projection optical system 21 converges the image light ML emitted from the image generation part 11 to form an image, and then causes the light to impinge on the transmissive tilted mirror 23. That is, the projection optical system 21 is disposed on the light path between the image generation part 11 and the transmissive tilted mirror 23. The projection optical system 21 includes a first lens system 21a, a bending reflection mirror 21b and a second lens system 21c. The first lens system 21a includes two lenses, 21f and 21g, in the example illustrated in FIG. 3, but may be composed of one lens or three or more lenses. The second lens system 21c includes one lens, 21i, in the example illustrated in FIG. 3, but may be composed of two or more lenses. Each of the lenses 21f, 21g and 21i may be a spherical lens, an aspheric lens, a free curved surface lens or the like, for example. The bending reflection mirror 21b is a plate-shaped optical member, and includes a flat reflective surface MS1. The flat reflective surface MS1 of the bending reflection mirror 21b is composed of a metal film or a dielectric multilayer film. The flat reflective surface MS1 is obtained by forming a reflective film composed of a single layer film or a multilayer film formed of a metal such as Al and Ag or other materials by on a flat plate surface by vapor deposition and the like. The bending reflection mirror 21b bends an optical axis AX in a direction of an acute angle smaller than 90° in the YZ plane. The image light ML that travels in the +Z direction, which is the forward direction, through the first lens system 21a is bent by the bending reflection mirror 21b in an oblique and rear downward direction between the −Y direction and the −Z direction, and then the light impinges on the transmissive tilted mirror 23 through the second lens system 21c.

The transmissive tilted mirror 23 is an optical member in a form of a flat plate, and includes a flat reflective surface MS2 having transmissivity. The term "transmit" in the transmissive tilted mirror 23 means partial transmission of light. The transmissive tilted mirror 23 is a mirror in which a metal film or a dielectric multilayer film as a transmissive reflective film is formed on one surface 23f of a parallel flat plate 23a having a uniform thickness and transmissivity, and the transmissive reflective film functions as the flat reflective surface MS2. The reflectance and transmittance of the flat reflective surface MS2 are set to approximately 50%, for example. It is to be noted that an anti-reflective film is formed on another surface 23r of the parallel flat plate 23a.

The transmissive tilted mirror 23 bends the optical axis AX in a substantially orthogonal direction in the YZ plane. The image light ML that travels in a direction slightly tilted rearward with respect to the −Y direction through the first lens system 21a of the projection optical system 21 is bent by the transmissive tilted mirror 23 in a direction slightly tilted downward with respect to the +Z direction, and then the light impinges on the concave transmissive mirror 24. The transmissive tilted mirror 23 is disposed between the concave transmissive mirror 24 and an exit pupil EP where the eye EY or the pupil hole is located, so as to cover the exit pupil EP. The transmissive tilted mirror 23 can be directly or indirectly fixed to the outer frame of the display driving part 102 illustrated in FIG. 1 and the positional relationship with the concave transmissive mirror 24 and the like can be appropriately set.

With respect to the XY plane extending in the vertical direction, the transmissive tilted mirror 23 or the flat reflective surface MS2 are tilted by an angle θ=approximately 20 to 40° in the counterclockwise direction around the X axis as viewed from the −X side (see the lateral sectional view of FIG. 2). In this manner, the transmissive tilted mirror 23 is disposed such that the angle between the Y axis, which is a vertical axis, and the transmissive tilted mirror 23 is smaller than 45°. When the angle between the Y axis and the transmissive tilted mirror 23 is greater than 45°, the transmissive tilted mirror 23 is tilted than the standard state, and the thickness of the transmissive tilted mirror 23 in the Z-axis direction increases, whereas when the angle between the Y axis and the transmissive tilted mirror 23 is smaller than 45°, the transmissive tilted mirror 23 is raised than the standard state, and the thickness of the transmissive tilted mirror 23 in the Z-axis direction is reduced. That is, by setting the angle between the Y axis and the transmissive tilted mirror 23 to an angle smaller than 45° as in the present embodiment, an installation in which the transmissive tilted mirror 23 largely protrudes in the −Z direction of the back surface with respect to the concave transmissive mirror 24 can be avoided, and the increase of the thickness of the virtual image display device 100 or the optical unit 12 in the Z direction in the front-rear direction can be avoided.

The concave transmissive mirror 24 is an optical member with a concave shape toward the exit pupil EP, and includes a transmissive partial reflective surface MC. The term "transmit" in the concave transmissive mirror 24 means partial transmission of light. The concave transmissive mirror 24 has a light convergence function, collimates the image light ML reflected and scattered at the transmissive tilted mirror 23, and enters the light into the exit pupil EP through the transmissive tilted mirror 23. The concave transmissive mirror 24 has the concave surface toward the exit pupil EP and a convex surface toward the external side as a reverse of the concave surface, and thus has a curved shape with a uniform thickness. A plate-shaped member 24a of the concave transmissive mirror 24 is a base material that defines the external shape of the concave transmissive mirror 24. The plate-shaped member 24a has a transmissivity for transmitting light with no substantial loss. A metal film or a dielectric multilayer film is formed as a partial reflective film on one surface 24r of the plate-shaped member 24a, and such a partial reflective film functions as the concave partial reflective surface MC. The reflectance and transmittance of the partial reflective surface MC are set to approximately 20 to 50%, for example. It is to be noted that an anti-reflective film is formed on the other surface 24f of the plate-shaped member 24a. The partial reflective surface MC is not limited to a spherical surface, and may be an aspherical surface or other axisymmetric curved surfaces.

The image light ML travelling forward after being reflected by the transmissive tilted mirror 23 is reflected back to the transmissive tilted mirror 23 by the concave transmissive mirror 24 such that the light is partially transmitted through the transmissive tilted mirror 23 and collected at the exit pupil EP. That is, the concave transmissive mirror 24 reflects the image light ML such that the light is collected at the exit pupil EP. An emission light axis AXE from the transmissive tilted mirror 23 toward the concave transmissive mirror 24 coincides with the optical axis AX folded back at the concave transmissive mirror 24 toward the exit pupil EP. The image light ML reflected by the transmissive tilted mirror 23 impinges on the entirety of the transmissive reflective surface MC of the concave transmissive mirror 24 from a substantially perpendicular direction, and has a high optical symmetry. The concave transmissive mirror 24 covers the transmissive tilted mirror 23 on the external side. In the optical system illustrated in the drawing, the emission light axis AXE, which is an axis line from the transmissive tilted mirror 23 toward the concave transmissive mirror 24 and is also an axis line from the concave transmissive mirror 24 toward the center of the exit pupil EP, extends with a downward tilt of approximately 10° with respect to the +Z direction as the forward direction. With the emission light axis AXE tilted downward on the front side at approximately 10° with respect to the Z axis, which is a horizontal axis, the fatigue of the eye EY of the wearer US observing virtual images can be reduced.

While the partial reflective surface MC may be a free curved surface, an intended reflection property can be easily provided to the partial reflective surface MC when the partial reflective surface MC is an axisymmetric curved surface.

The concave transmissive mirror 24 is incorporated to constitute a part of the transmissive optical element 105 illustrated in FIG. 1. That is, by providing a transmissive or non-transmissive plate-shaped member around the concave transmissive mirror 24 in an extended manner, the optical element 105 including the concave transmissive mirror 24 can be achieved. The optical element 105 is not limited to the eyeglass-lens form, and may have various outlines or exterior appearances.

From the viewpoint of ensuring the strength of the shape, the concave transmissive mirror 24 or the plate-shaped member 24a has a thickness of 1 mm or greater, but preferably has a thickness of 2 mm or smaller from the viewpoint of weight reduction. The plate-shaped member 24a is formed by injection molding using an optically transparent resin material, for example.

The shade element 27 is supported by the display driving part 102 illustrated in FIG. 1 and disposed in the state where it faces the concave transmissive mirror 24 with a space therebetween. The shade element 27 includes a partial reflective surface SM serving as a light superimposing part 51. The shade element 27 is obtained by forming a dielectric multilayer film as a reflective filter on one surface 27f of a transmissive plate-shaped member 27a with a uniform thickness, and the reflective filter functions as the partial reflective surface SM. The partial reflective surface SM is not limited to a spherical surface, and may be an aspherical surface, a free curved surface or the like. As elaborated later, the partial reflective surface SM has a wavelength property in which the reflectance differs depending on the wavelength range. That is, the partial reflective surface SM is a wavelength-dependent reflective filter, and reflects the external light OL in the wavelength range of the image light ML, while partially transmitting the external light OL in the other wavelength range. The partial reflective surface SM functions as the light superimposing part 51 that superimposes additional light AL resulting from the external light OL on the image light ML transmitted through the concave transmissive mirror 24 (i.e., leaked light LE). In this case, the additional light AL can be formed through the reflection of the external light OL, and no special light source is required.

It is to be noted that an anti-reflective film can be formed on the other surface 27r of the plate-shaped member 27a. In this manner, ghost can be suppressed.

While the shade element 27 or the plate-shaped member 27a has a thickness of 0.5 mm or greater from the viewpoint of ensuring the shape strength, it is preferable to have a thickness of 2 mm or smaller from the viewpoint of weight reduction. The plate-shaped member 27a is formed by injection molding using an optically transparent resin material, for example.

Regarding the light path, the image light ML from the image generation part 11 is focused and bent by the projection optical system 21 to form an image, and then the light impinges on the transmissive tilted mirror 23. The image light ML reflected by the transmissive tilted mirror 23 by, for example, approximately 50%, impinges on the concave transmissive mirror 24 and is then reflected by the partial reflective surface MC by a reflectance of approximately 50% or smaller, for example. The image light ML reflected by the concave transmissive mirror 24 impinges on the exit pupil EP where the eye EY or pupil hole of the wearer US is located. Here, the exit pupil EP is an eye point of the optical unit 12 where the eye EY is assumed to be located, and light from each point of the display surface 11a of the image generation part 11 impinges in one place in a collected manner at an angle that enables observation of virtual images. Between the transmissive tilted mirror 23 and the projection optical system 21, an intermediate image II is formed. The intermediate image II is an image obtained by appropriately enlarging an image formed on the display surface 11a of the image generation part 11. External light OL passed through the shade element 27 and the concave transmissive mirror 24 also impinges on the exit pupil EP. That is, the wearer US wearing the HMD 200 can observe a virtual image of the image light ML superimposed on external images.

It is to be noted that while the concave transmissive mirror 24 transmits the external light OL, it also transmits the image light ML, and thus generates the leaked light LE on the front side of the concave transmissive mirror 24. If the leaked light LE is observed as it is, a third party OS existing around the wearer US can observe a part PI of the image displayed on the display surface 11a of the image light generation device 11 (see FIG. 1). In view of this, in the present embodiment, the partial reflective surface SM in the shade element 27 efficiently reflects the external light OL in the wavelength range of the image light ML and generates the additional light AL as described later. Thus, the leaked light LE is hidden in the additional light AL, and the observation of the part PI of the image by the third party OS is suppressed.

Figure 4:
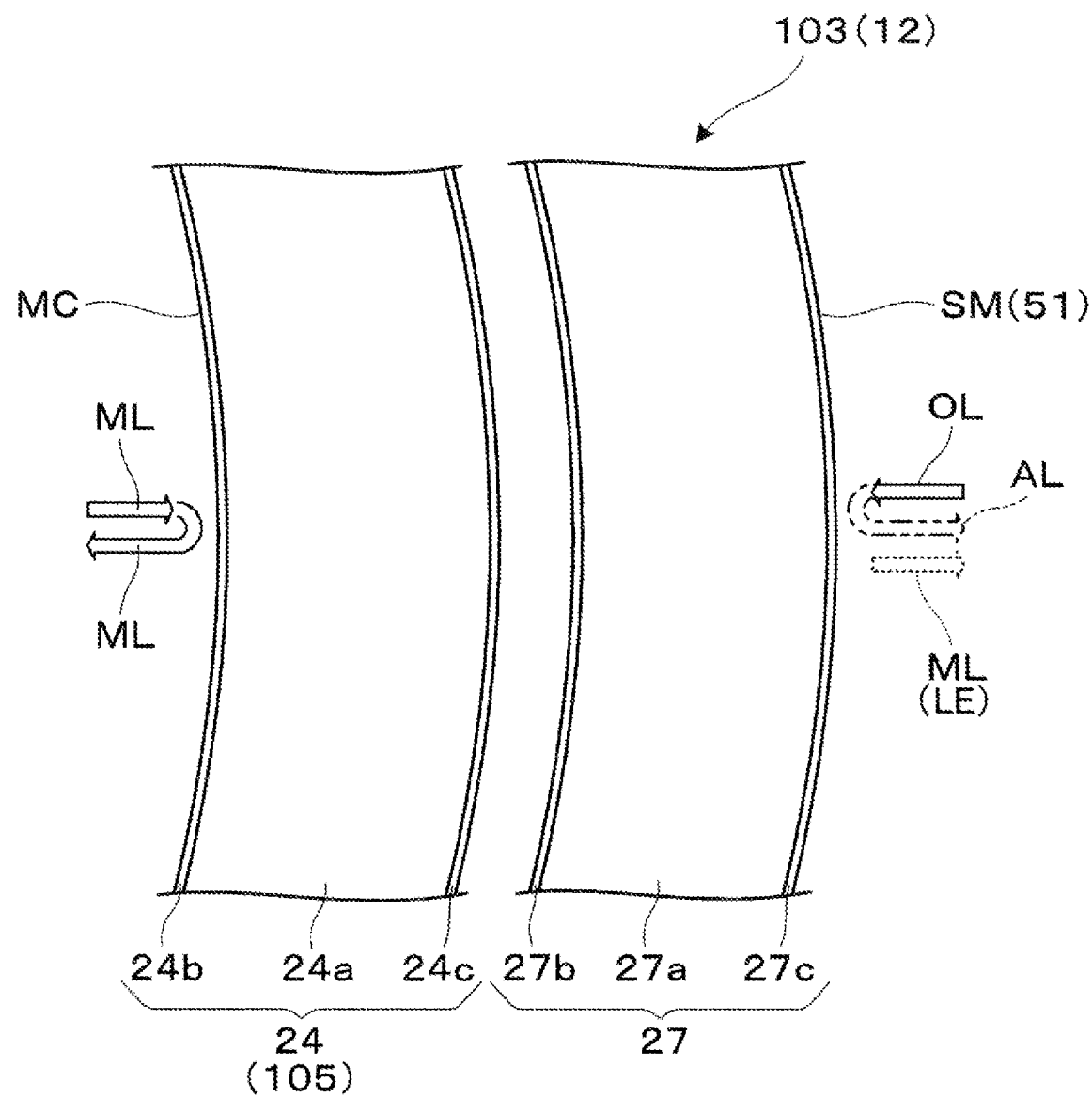
FIG. 4 is a partially enlarged side sectional view for describing a concave transmissive mirror and a shade element.

With reference to FIG. 4, structures of the concave transmissive mirror 24 and the shade element 27 are described below.

The concave transmissive mirror 24 includes the plate-shaped member 24a serving as a supporting member for maintaining the entire shape, a partial reflective film 24b formed on the inside (the exit pupil EP side in FIG. 2) of the plate-shaped member 24a, and an anti-reflective film 24c formed on the external side of the plate-shaped member 24a. The partial reflective film 24b functions as the partial reflective surface MC, and reflects the image light ML at a desired reflectance. It is to be noted that the partial reflective film 24b may not be directly formed on the plate-shaped member 24a. For example, the plate-shaped member 24a may be covered with a hard coat film and the partial reflective film 24b may be formed on top of that. The anti-reflective film 24c also may not be directly formed on the plate-shaped member 24a. For example, the plate-shaped member 24a may be covered with a hard coat film, and the anti-reflective film 24c may be formed on top of that.

The shade element 27 is disposed to cover the front side of the concave transmissive mirror 24. That is, with respect to an eye direction with the exit pupil EP as a starting point, the shade element 27 covers the external side of the transmissive tilted mirror 23, and in turn, the external side of the optically effective region, and extends across the range wider than that. The shade element 27 includes the plate-shaped member 27a as a supporting member, an anti-reflective film 27b formed on the inside of the plate-shaped member 27a, and an external light reflective film 27c formed on the external side of the plate-shaped member 27a. The external light reflective film 27c functions as the partial reflective surface SM, and reflects the external light OL in the wavelength range of the image light ML. It is to be noted that the external light reflective film 27c may not be directly formed on the plate-shaped member 27a. For example, the plate-shaped member 27a may be covered with a hard coat film, and the external light reflective film 27c may be formed on top of that. The anti-reflective film 27b also may not be directly formed on the plate-shaped member 27a. For example, the plate-shaped member 27a may be covered with a hard coat film, and the anti-reflective film 27b may be formed on top of that.

Figure 5:
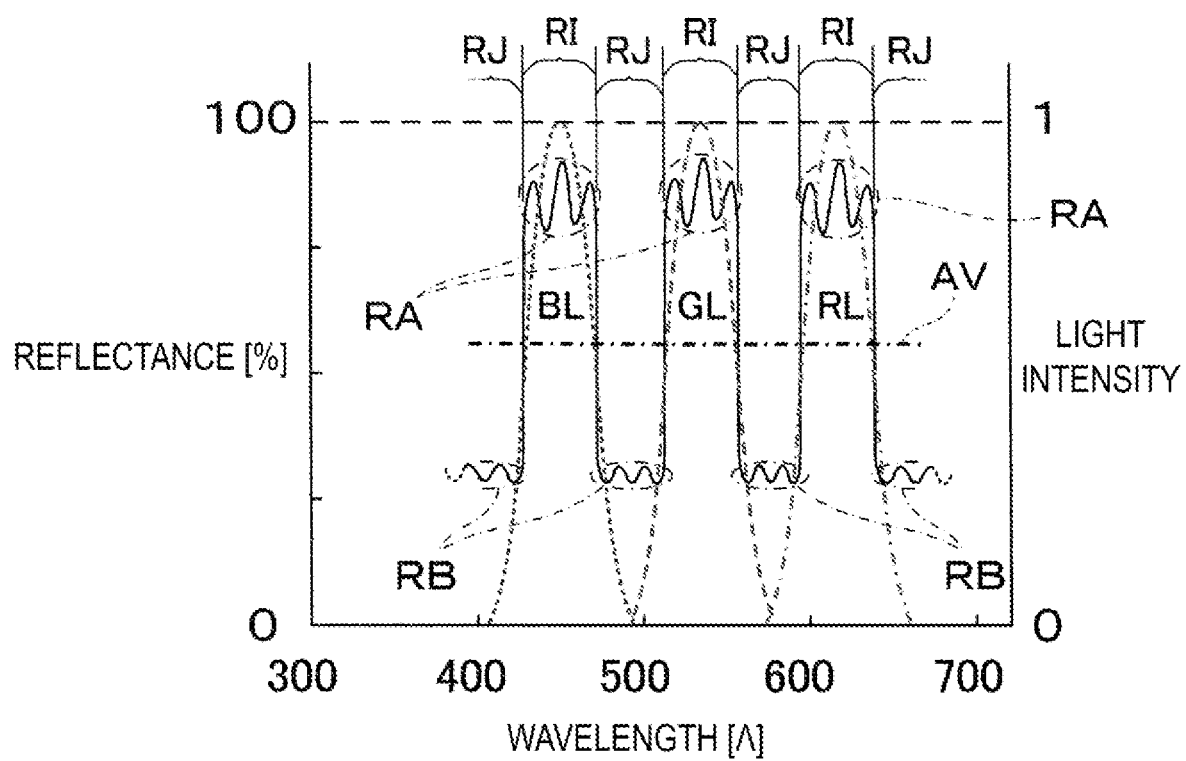
FIG. 5 is a chart for describing a wavelength property of image light and a reflection property of a partial reflective film.

FIG. 5 is a chart for describing a wavelength property of the image light ML emitted from the image generation part 11 and a reflection property of the external light reflective film 27c provided in the shade element 27. In this chart, the abscissa indicates the wavelength (nm), and the ordinate indicates the reflectance (%) or the light intensity (given unit). It is to be noted that the peak value of the light intensity of each color is equal for convenience of description, but this does not mean that the actual light intensity of each color is equal. That is, the actual light intensities of RGB have peak values different from each other.

The image light ML emitted from the image generation part 11 has a wavelength distribution property depending on the light emission property of the micro LED constituting the image generation part 11. The image light ML has a predetermined intensity or greater in a display wavelength region RI of each color of RGB. On the other hand, the image light ML emitted from the image generation part 11 has a predetermined intensity or smaller in other wavelength region RJ of the visible range other than the display wavelength region RI. More specifically, the wavelength of the display wavelength region RI of a blue component BL of the image light ML is 427 to 472 nm, the wavelength of the display wavelength region RI of a green component GL of the image light ML is 512 to 557 nm, and the wavelength of the display wavelength region RI of a red component RL of the image light ML is 594 to 638 nm. For example, while the display wavelength region RI may be defined based on the half value of the peak value of the image light ML, this is not limitative, and it may be defined based on, for example, 30% of the peak value.

The reflection property of the external light reflective film 27c includes a reflection property portion RA with a relatively increased reflectance in each display wavelength region RI of RGB. The reflectance of the external light reflective film 27c is set to approximately 80 to 90% in the reflection property portion RA, and set to approximately 20 to 70% in a transmission property portion RB corresponding to the other wavelength region RJ between RGB or outside RGB. This means that the external light reflective film 27c has a wavelength distribution, and the reflectance in the display wavelength region RI corresponding to the image light ML is higher than the reflectance in the other wavelength region RJ of the visible range other than the display wavelength region RI. While the reflectance in the reflection property portion RA varies depending on the wavelength in the example illustrated in the drawing, a property with a larger variation or a flat or uniform property with a smaller variation may also be adopted. In addition, while the reflectance varies depending on the wavelength also in the transmission property portion RB other than the reflection property portion RA, a property with a larger variation or a flat or uniform property with a smaller variation may also be adopted. Examples of the method of adjusting the reflectance and transmittance of the external light reflective film 27c may include adjusting the number of the layers of the dielectric multilayer films constituting the external light reflective film 27c, shifting the film thickness of the dielectric multilayer film from a proper design value that is set as, for example, λ/4 with respect to wavelength λ, and adjusting the film formation method and/or the film formation condition.

While FIG. 5 illustrates an example in which each display wavelength region RI and each the reflection property portion RA substantially match each other with respect to RGB, the reflection property portion RA of a specific color may be wider in terms of the wavelength than the display wavelength region RI of the corresponding color, or the reflection property portion RA of a specific color may be shorter in terms of the wavelength than the display wavelength region RI of the corresponding color.

The average reflectance AV of the external light reflective film 27c in the visible range is approximately 50 to 70%, and the reflectance of the reflection property portion RA, especially the peak value of the reflectance of the reflection property portion RA, is higher than the average reflectance AV of the entire visible range including the reflection property portion RA and the transmission property portion RB. The average reflectance of the external light is calculated by:

$$\{\alpha B \times \Delta \lambda B + \alpha G \times \Delta \lambda G + \alpha R \times \Delta \lambda R\} \chi (\Delta \lambda B + \Delta \lambda G + \Delta \lambda R) + \{\alpha 1 \times \delta \lambda 1 + \alpha 2 \times \delta \lambda 2 + \alpha 3 \times \delta \lambda 3 + \alpha 4 \times \delta \lambda 4\} \chi (\delta \lambda 1 + \delta \lambda 2 + \delta \lambda 3 + \delta \lambda 4)$$

where $\alpha B$, $\alpha G$ and $\alpha R$ are the reflectances in the three reflection property portions RA; $\Delta \lambda B$, $\Delta \lambda G$ and $\Delta \lambda R$ are the wavelength widths of the three reflection property portions RA; $\alpha 1$, $\alpha 2$, $\alpha 3$ and $\alpha 4$ are the reflectances of the four transmission property portions RB other than the three reflection property portions RA; and $\delta \lambda 1$, $\delta \lambda 2$, $\delta \lambda 3$ and $\delta \lambda 4$ are the wavelength widths of the four transmission property portions RB.

As illustrated in FIG. 4, with the external light reflective film 27c, i.e., the partial reflective surface SM provided in the shade element 27, the external light OL incident from the external side of the shade element 27 is efficiently reflected in the wavelength range of the image light ML, and the reflection light is emitted as the additional light AL in the external direction of the shade element 27. On the other hand, the image light ML partially passed through the concave transmissive mirror 24 impinges on the inside of the shade element 27. Most of this image light ML is reflected by the external light reflective film 27c, and a slight component that is attenuated is emitted as the leaked light LE in the external direction of the shade element 27. When the intensity of the leaked light LE is substantially smaller than the intensity of the additional light AL, the wavelength ranges of the lights match each other, the leaked light LE is lost and hidden in the additional light AL, the additional light AL acts as backlight, and thus the observation or recognition of the image corresponding to the image light ML by the third party OS can be suppressed. Here, it is conceivable to increase the intensity of the external light OL for the purpose of relatively increasing the intensity of the additional light AL, but the intensity of the external light OL depends on the factors of the environment where the virtual image display device 100 is placed, and therefore cannot be actively controlled. In view of this, by increasing the reflectance for the external light OL of the partial reflective surface SM, it is possible to achieve a backlight effect for making the leaked light LE less noticeable by increasing the intensity of the additional light AL to a non-negligible level with respect to the leaked light LE even with weak external light OL. Regarding the reflection property portion RA of each color, when the reflectance for the external light OL of the partial reflective surface SM is increased, the transmittance for the image light ML of the partial reflective surface SM is reduced by a predetermined value or more, and thus the backlight effect for making the leaked light LE less noticeable can be ensured. It is to be noted that the backlight effect is also caused by increasing the reflectance in the transmission property portion RB between each color, but then the color of the additional light AL and the color of the leaked light LE differ from each other, and consequently the effect of making the leaked light LE less noticeable is reduced. In addition, when the reflectance in the transmission property portion RB between each color is increased, the transmittance of the external light OL is reduced and the external image becomes less observable, but it can be said that the blocking of the external light OL is increased. On the other hand, when the reflectance of the transmission property portion RB between each color is suppressed at a low level, the transmittance of the external light OL increases and the external image becomes more observable.

In a specific example, the light is adjusted such that the intensity of the additional light AL falls within the range of 0.5 to 2 times the intensity of the leaked light LE of the image light ML.

The external light reflective film 27c is not limited to the configuration formed on the external side of the shade element 27 as illustrated in the drawing, and may be formed on the inside of the shade element 27.

In the shade element 27, when the reflectance of the partial reflective surface SM for the image light ML becomes relatively high, the reflection of the image light ML at the partial reflective surface SM may result in ghost. Examples of a method for avoiding such a situation may include sufficiently separating the shade element 27 from the concave transmissive mirror 24, and providing a difference of a predetermined level or greater between the curvature of the shade element 27 and the curvature of the concave transmissive mirror 24.

In the virtual image display device 100 of the first embodiment described above, the light superimposing part 51 provided on the external side of the partial reflective film 24b provided in the concave transmissive mirror 24 superimposes the additional light AL of the visible range on the image light ML transmitted through the partial reflective film 24b, and the leaked light LE passed through the concave transmissive mirror 24 is hidden in the additional light AL and becomes less noticeable, and thus, the observation of a part of the image by third parties can be prevented.

In particular, in the virtual image display device 100 of the first embodiment, not only the shade element 27 can weaken the image light ML emitted to the external side, but also the shade element 27 can actively form the additional light AL.

Second Embodiment

A virtual image display device of a second embodiment is described below. The virtual image display device and the like of the second embodiment are obtained by partially changing the virtual image display device of the first embodiment, and therefore the description for the common portions is omitted.

Figure 6A:
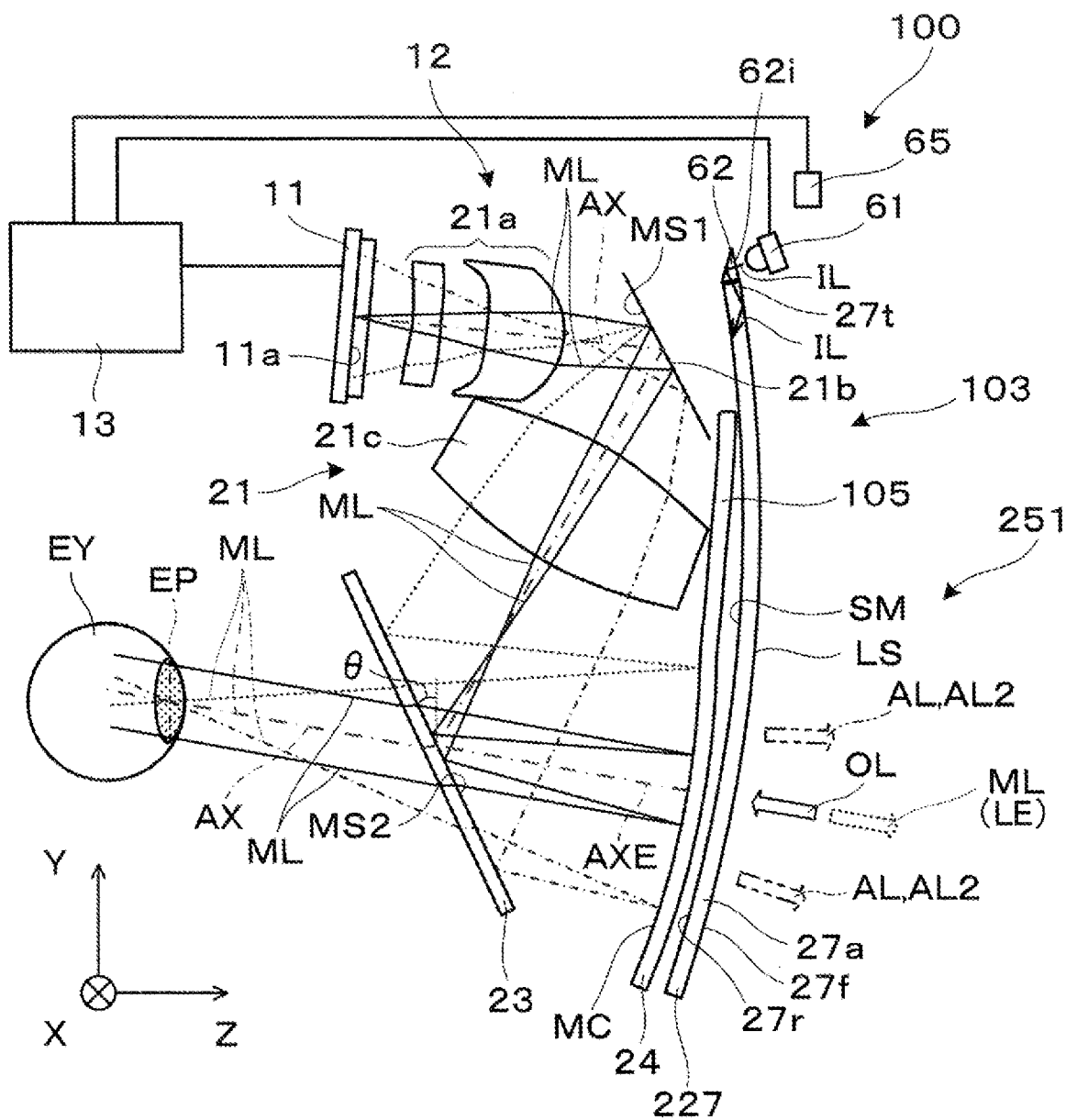
FIG. 6A is a conceptual side sectional view for describing a second embodiment.
Figure 6B:
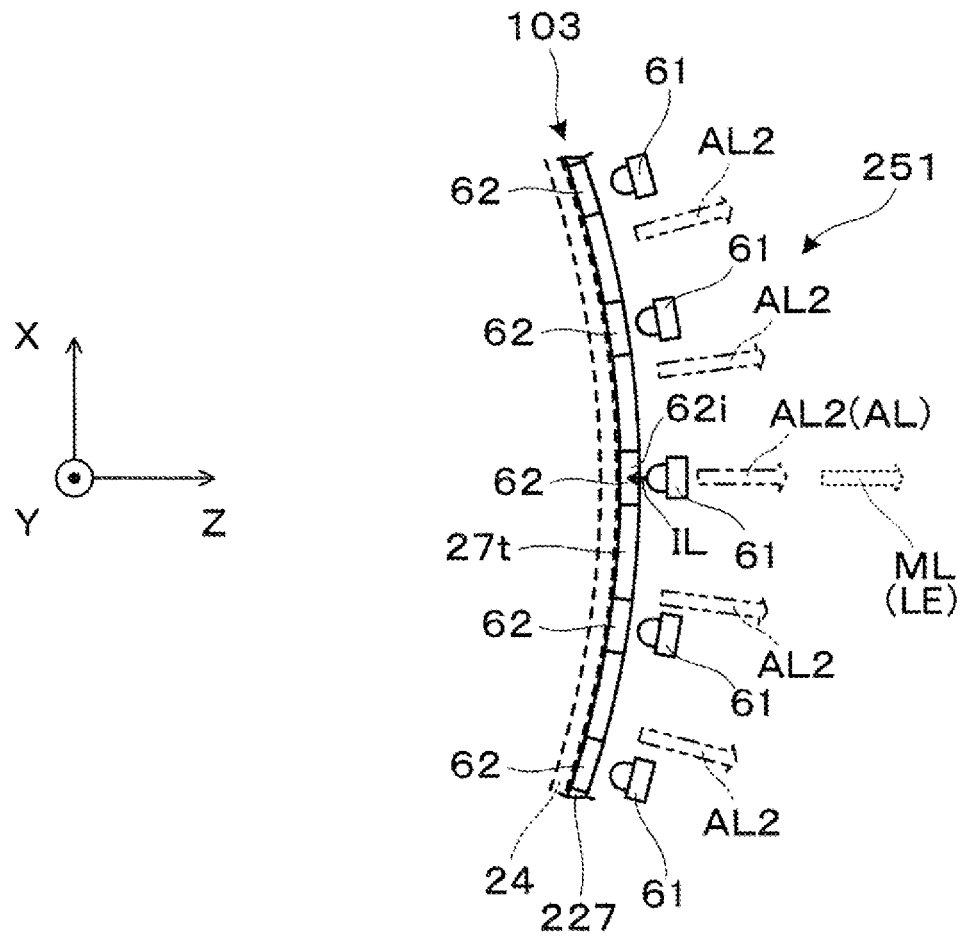
FIG. 6B is a plan view of a shade element and the like as viewed from the upper end side.

FIG. 6A is a conceptual side sectional view for describing the cover 103 and the like incorporated in the virtual image display device 100 of the second embodiment, and FIG. 6B is a plan view of a shade element 227 and the like constituting the cover 103 as viewed from the upper end side. In this case, a plurality of incident parts 62 is fixed to an upper end portion 27t of the shade element 227 disposed on the external side of the concave transmissive mirror 24 in the cover 103, and a plurality of light sources 61 is disposed to face incident surfaces 62i of the plurality of incident parts 62. The plurality of light sources 61 is held in the outer frame of the display driving part 102 illustrated in FIG. 1. Desirably, the light-emission wavelength of the light source 61 corresponds to the wavelength of RGB generated by the image generation part 11, but this is not limitative. The incident part 62 is an optically transparent prism shaped member, and is joined to the upper end portion 27t of the shade element 227 using a bonding material. The incident part 62 is obtained by forming a reflective surface on the surface of a prism shaped member. Illuminating light IL emitted by each light source 61 is introduced to the shade element 227 through an incident surface 62i of the incident part 62 facing thereto. The light source 61 is operated by being driven by the display control circuit 13. The incident part 62 introduces the illuminating light IL of the light source 61 into the shade element 227 so that it can be used as additional light AL2 described later. With the light source 61, the additional light AL2 can be compulsorily formed.

Figure 7:
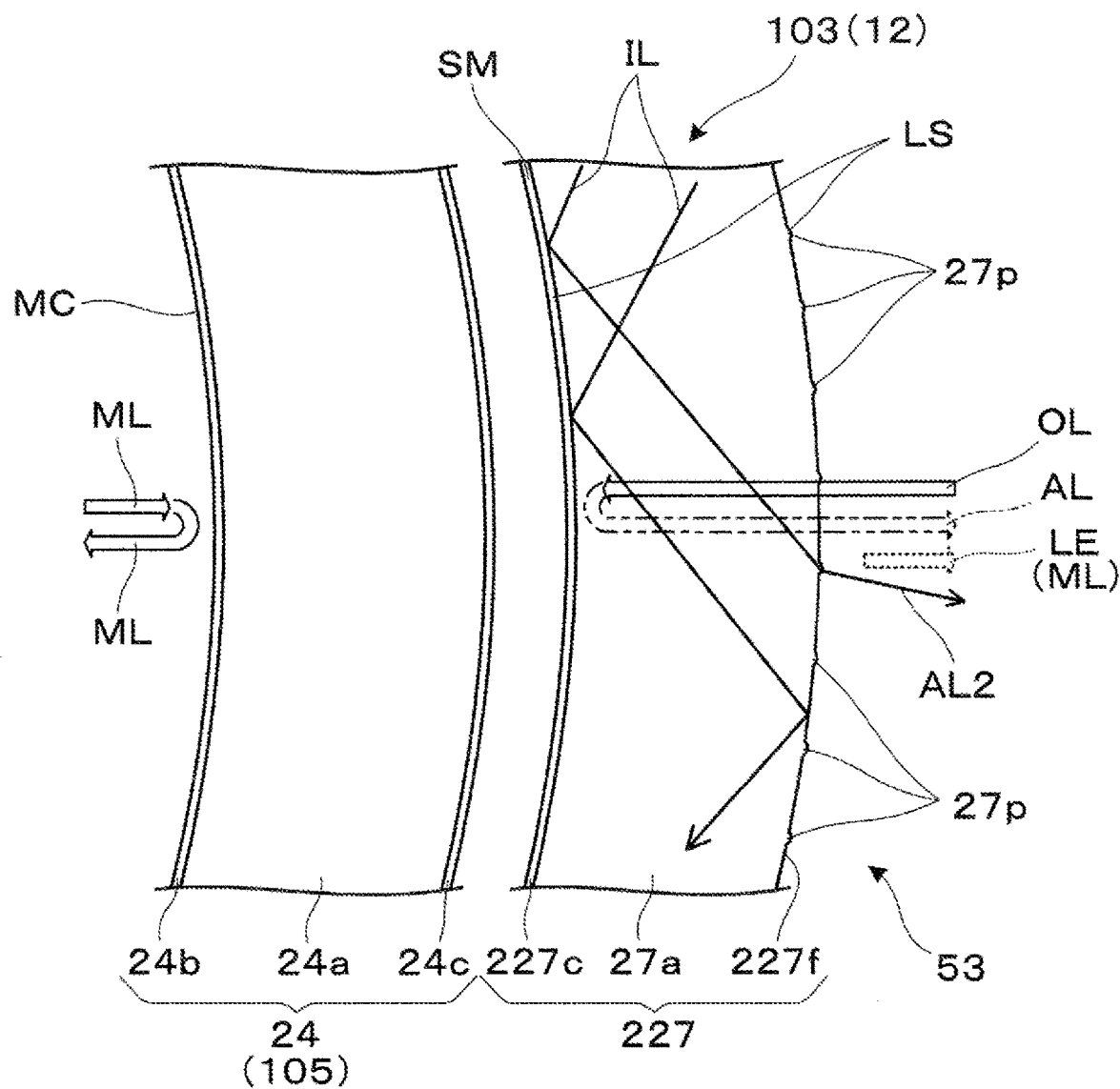

FIG. 7 is an enlarged side sectional view for describing structures and functions of the shade element 227 and the like. In the shade element 227, an external light reflective film 227c is formed on the inside of the plate-shaped member 27a, and a scattering structure 27p including a scattering member having a thin scattering structure or a very small uneven structure with optical inhomogeneity in refractive index and/or transmissivity with which a part of light propagating in the plate-shaped member 27a will not satisfy the internal total reflection condition is formed in an outer surface 227f of the plate-shaped member 27a. The external light reflective film 227c is similar to the external light reflective film 27c provided in the shade element 27 of the first embodiment, and it has a high reflectance in the wavelength range corresponding to RGB and a relatively low reflectance in the wavelength range between RGB or outside RGB (see the reflection property exemplified in FIG. 5). The scattering structure 27p is composed of a plurality of minute recesses or protrusions, bends the illuminating light IL introduced into the shade element 227 through refraction and/or scattering, and emits it in the external direction or front direction outside the shade element 227, for example. Furthermore, in the region other than the scattering structure 27p, the outer surface 227f also performs a role of uniformly diffusing the illuminating light IL introduced into the shade element 227 by reflecting the light at the inner surface and guiding the light in the plate-shaped member 27a.

With reference to FIG. 6A, the plurality of light sources 61, the plurality of incident parts 62, and the shade element 227 function as a light superimposing part 251 that superimposes the additional light AL2 of the visible range and the like on the image light ML transmitted through the concave transmissive mirror 24, i.e., the partial reflective film 24b.

The light superimposing part 251 of the present embodiment is a part obtained by combining a superimposing member such as the shade element 227 with the light source 61 and/or the incident part 62, and in the specification, the light superimposing part 251 is referred to also as a light superimposer. In addition, with reference to FIG. 7, in the shade element 227, the external light reflective film 227c, the plate-shaped member 27a and the scattering structure 27p function as a light guiding part 53 that guides the illuminating light IL introduced from the incident part 62 and emits the illuminating light IL as the additional light AL2 in the front direction of the concave transmissive mirror 24. The external light reflective film 227c and the scattering structure 27p function as a diffusion part LS that diffuses the illuminating light IL in the shade element 227.

In the present embodiment, the illuminating light IL emitted to the outside of the shade element 227 by the scattering structure 27p of the shade element 227 or the diffusion part LS is emitted in the external direction or front direction of the shade element 227 as the additional light AL2. That is, the additional light AL resulting from the external light reflective film 227c and the additional light AL resulting from the diffusion part LS 2 are emitted by the light superimposing part 251 in the front direction of the shade element 227, and the light functions as backlight that makes the leaked light LE of the image light ML less noticeable. As a result, the leaked light LE is hidden in the additional light AL and AL2, and the observation of the part PI of the image (see FIG. 1) by the third party OS can be more effectively suppressed.

As illustrated in FIG. 6A, the virtual image display device 100 includes an external light sensor 65. The external light sensor 65 measures the external light that is incident from the front side of the virtual image display device 100 or the cover 103, and enables monitoring of the intensity of the external light OL by the display control circuit 13. When the output of the external light sensor 65 indicates a reduction in the intensity of the external light OL, the display control circuit 13 turns on the light source 61 such that the additional light AL2 is emitted in the front direction of the shade element 227. In this manner, in addition to the additional light AL resulting from the passive external light OL, the active additional light AL2 with a predetermined intensity can be superimposed on the leaked light LE, and thus the recognition of the image light ML from the external side can be reliably avoided by reducing the dependency on the external light OL.

The display control circuit 13 may adjust the intensity of the illuminating light IL output from the light source 61 in accordance with the output of the external light sensor 65. In this case, when the intensity of the external light OL is reduced, the additional light AL and AL2 as a whole can be maintained at a predetermined value or greater with respect to the leaked light LE by increasing the intensity of the illuminating light IL. Thus, an operation in accordance with the external light OL can be achieved, and the leaked light LE can be efficiently made less noticeable.

The external light reflective film 227c of the shade element 227 is not limited to the configuration in which the reflectance has a wavelength property, and may be replaced by a configuration with a uniform reflectance in the entire visible wavelength range. As the external light reflective film 227c whose reflectance has no wavelength property, a partial reflective film composed of a single layer film or a multilayer film formed of metal or other material may be used.

Third Embodiment

A virtual image display device of a third embodiment is described below. The virtual image display device and the like of the third embodiment are obtained by partially changing the virtual image display device of the first embodiment, and therefore the description for the common portions is omitted.

Figure 8A:
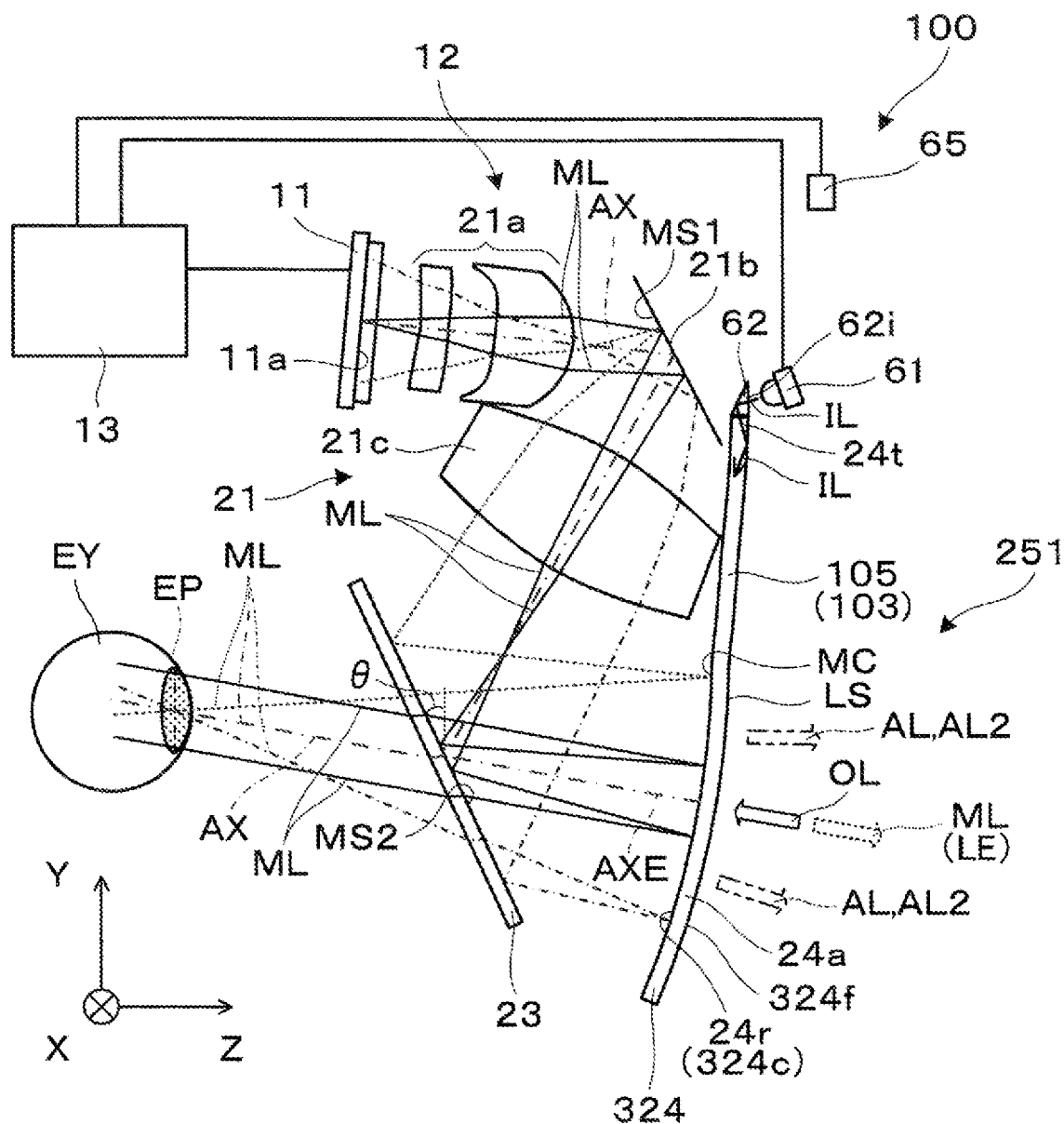
FIG. 8A is a conceptual side sectional view for describing a third embodiment.
Figure 8B:
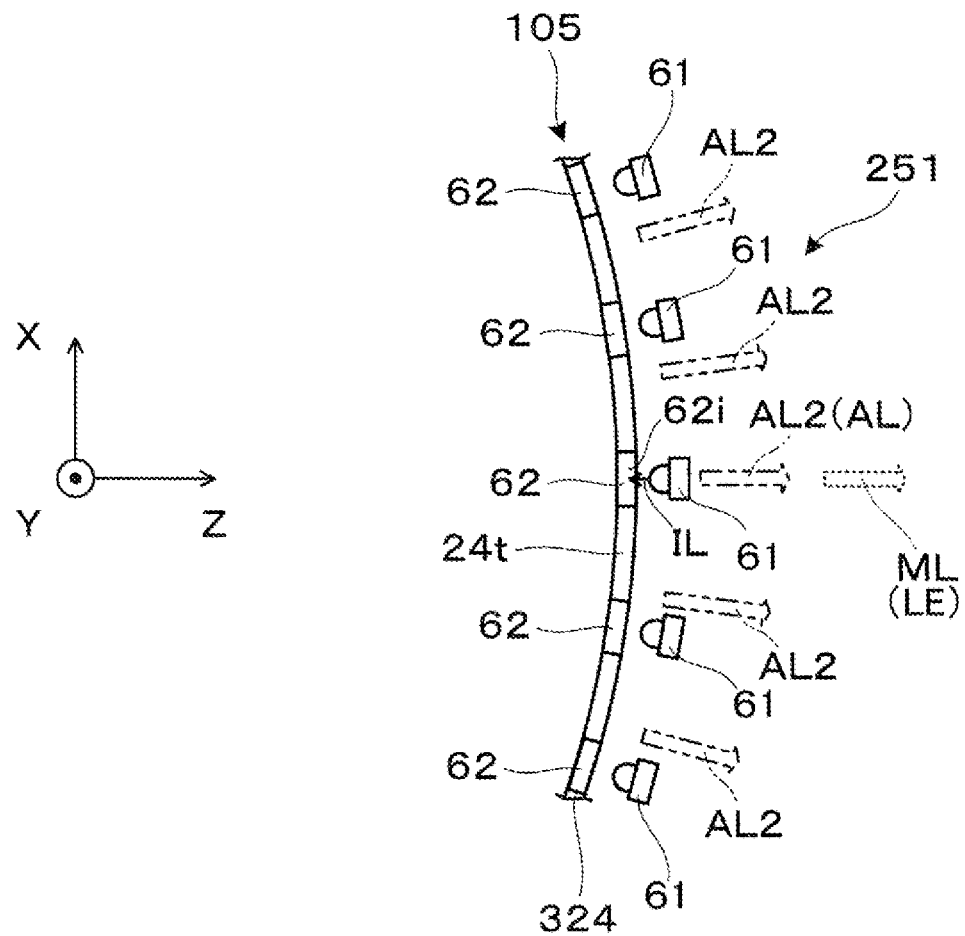
FIG. 8B is a plan view of a concave transmissive mirror and the like as viewed from the upper end side.

FIG. 8A is a conceptual side sectional view for describing a concave transmissive mirror 324 and the like incorporated in the virtual image display device 100 of the third embodiment, and FIG. 8B is a plan view of the concave transmissive mirror 324 and the like as viewed from the upper end side. In this case, the plurality of incident parts 62 is joined at an upper end portion 24t of the concave transmissive mirror 324, and the plurality of light sources 61 is disposed to face the incident surfaces 62i of the plurality of incident parts 62. The plurality of light sources 61 is held in the outer frame of the display driving part 102 illustrated in FIG. 1. The incident part 62 is a prism shaped member, and is joined to the upper end portion 24t of the concave transmissive mirror 324 with a bonding material and the like. The illuminating light IL emitted by each light source 61 is introduced to the concave transmissive mirror 324 through the incident part 62 facing thereto. The light source 61 is operated by being driven by the display control circuit 13. The incident part 62 introduces the illuminating light IL from the light source 61 into the concave transmissive mirror 324 such that the light can be utilized as additional light described later.

Figure 9:
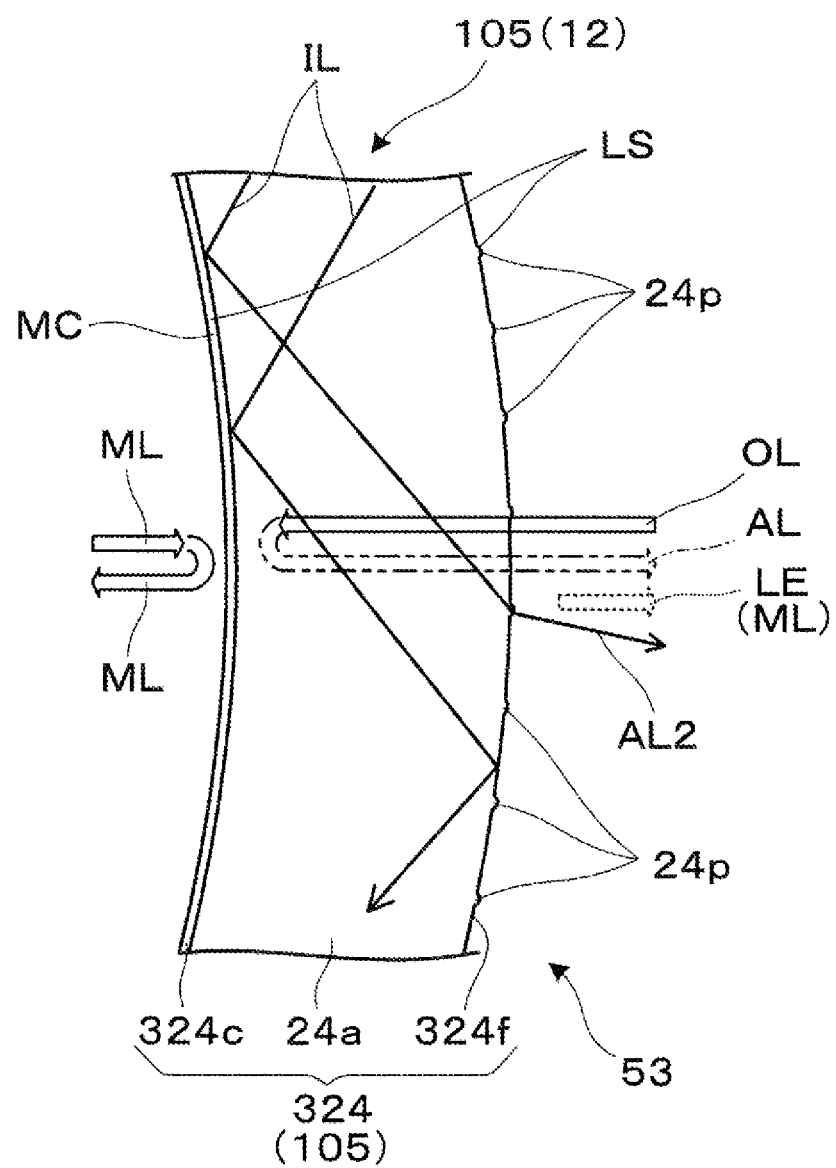

FIG. 9 is an enlarged side sectional view for describing a structure and a function of the concave transmissive mirror 324. In the concave transmissive mirror 324, an external light reflective film 324c is formed as a partial reflective film on the inside of the plate-shaped member 24a, and a scattering structure 24p is formed in an outer surface 324f of the plate-shaped member 24a. The external light reflective film 324c has a wavelength property as with the external light reflective film 27c provided in the shade element 27 of the first embodiment, and it has a high reflectance in the wavelength range corresponding to RGB and a relatively low reflectance in the wavelength range between RGB or outside RGB (see the reflection property exemplified in FIG. 5). That is, the external light reflective film 324c efficiently reflects the external light OL in the wavelength range of the image light ML, and emits the additional light AL to the external side of the concave transmissive mirror 324. The scattering structure 24p, which is composed of a plurality of minute recesses or protrusions, bends the illuminating light IL introduced into the concave transmissive mirror 324 through refraction and/or scattering, and emits it in the external direction or front direction outside the concave transmissive mirror 324. Furthermore, in the region other than the scattering structure 24p, the outer surface 324f also performs a role of uniformly diffusing the illuminating light IL introduced into the concave transmissive mirror 324 by reflecting the light at the inner surface and guiding the light in the plate-shaped member 24a.

With reference to FIG. 8A, the plurality of light sources 61, the plurality of incident parts 62 and the concave transmissive mirror 324 function as the light superimposing part 251 that superimposes the additional light AL and AL2 of the visible range on the image light ML that passes through the concave transmissive mirror 324. The light superimposing part 251 is obtained by combining a superimposing member such as the concave transmissive mirror 324 with the light source 61 and/or the incident part 62, and in this specification, the light superimposing part 251 is referred to also as a light superimposer. In addition, with reference to FIG. 9, in the concave transmissive mirror 324, the external light reflective film 324c, the plate-shaped member 24a and the scattering structure 24p function as the light guiding part 53 that guides the illuminating light IL introduced from the incident part 62 and emits the light in the front direction of the concave transmissive mirror 324 as the additional light AL2. The external light reflective film 324c and the scattering structure 24p function as the diffusion part LS that diffuses the illuminating light IL in the concave transmissive mirror 324.

In the present embodiment, the illuminating light IL emitted to the outside of the concave transmissive mirror 324 by the scattering structure 24p of the concave transmissive mirror 324 or the diffusion part LS is emitted in the front direction of the concave transmissive mirror 324 as the additional light AL2. That is, the additional light AL resulting from the external light reflective film 324c and the additional light AL2 resulting from the diffusion part LS are emitted in the external direction or front direction of the concave transmissive mirror 324 by the light superimposing part 251, and the light functions as backlight that makes the leaked light LE of the image light ML less noticeable. As a result, the leaked light LE is hidden in the additional light AL and AL2, and the observation of the part PI of the image (see FIG. 1) by the third party OS can be more effectively suppressed.

As illustrated in FIG. 8A, the virtual image display device 100 includes the external light sensor 65. The external light sensor 65 measures the external light that is incident from the front side of the virtual image display device 100, and enables monitoring of the intensity of the external light OL by the display control circuit 13. When the output of the external light sensor 65 indicates a reduction in the intensity of the external light OL, the display control circuit 13 turns on the light source 61 such that the additional light AL2 is emitted to the front side of the concave transmissive mirror 324. In this manner, the additional light AL resulting from the passive external light OL and the active additional light AL2 corresponding to the output of the external light sensor 65 can be superimposed on the leaked light LE, and the recognition of the image light ML from the external side can be avoided.

The display control circuit 13 may adjust the intensity of the illuminating light IL output from the light source 61 in accordance with the output of the external light sensor 65.

The external light reflective film 324c of the concave transmissive mirror 324 is not limited to the configuration in which the reflectance has a wavelength property, and may be replaced by a configuration with a uniform reflectance in the entire visible wavelength range. As the external light reflective film 324c whose reflectance has no wavelength property, a partial reflective film composed of a single layer film or a multilayer film formed of metal or other material may be used.

Fourth Embodiment

A virtual image display device of a fourth embodiment is described below. The virtual image display device and the like of the fourth embodiment are obtained by partially changing the virtual image display device of the first embodiment, and therefore the description for the common portions is omitted.

Figure 10A:
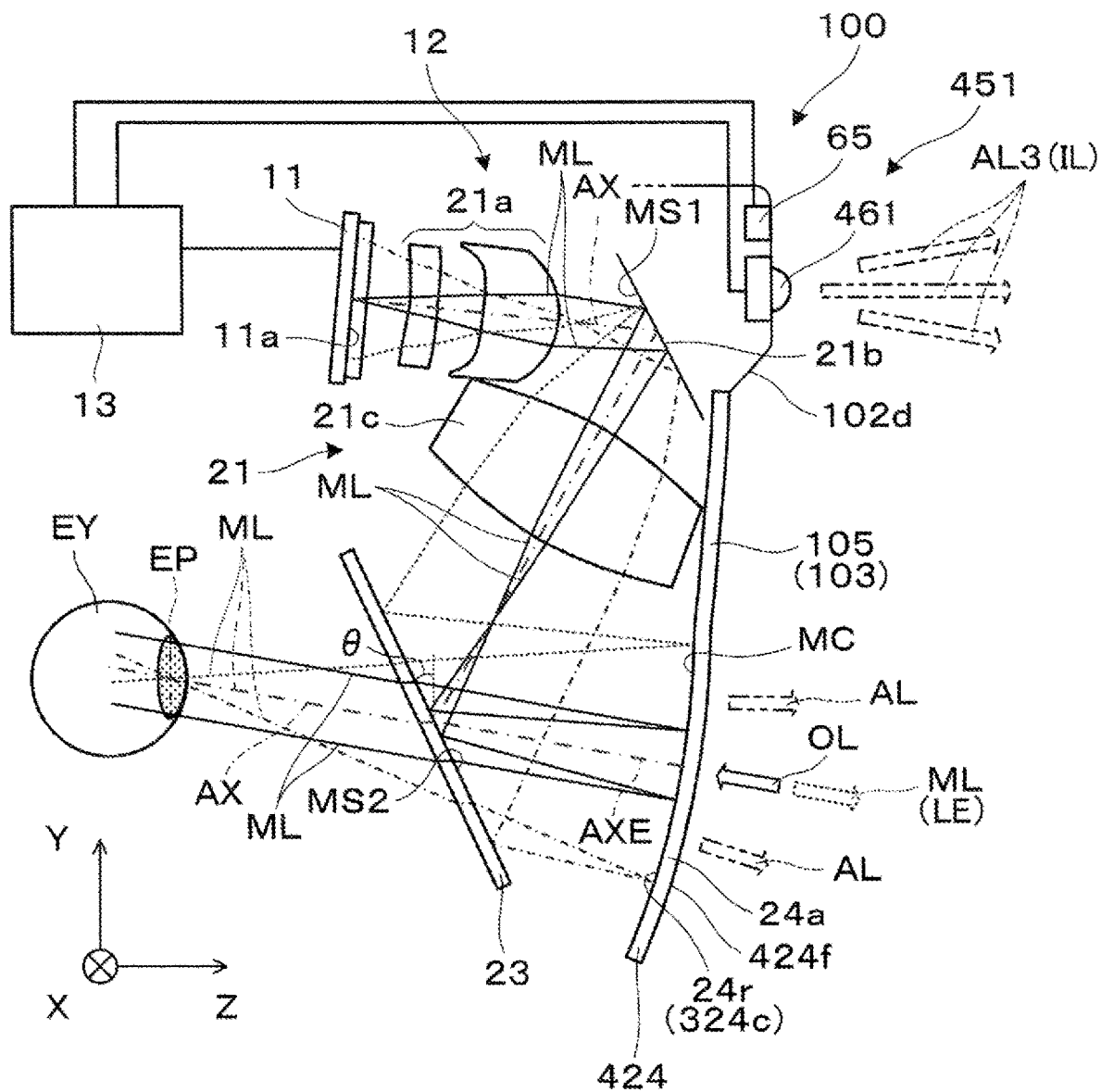
FIG. 10A is a conceptual side sectional view for describing a fourth embodiment.
Figure 10B:
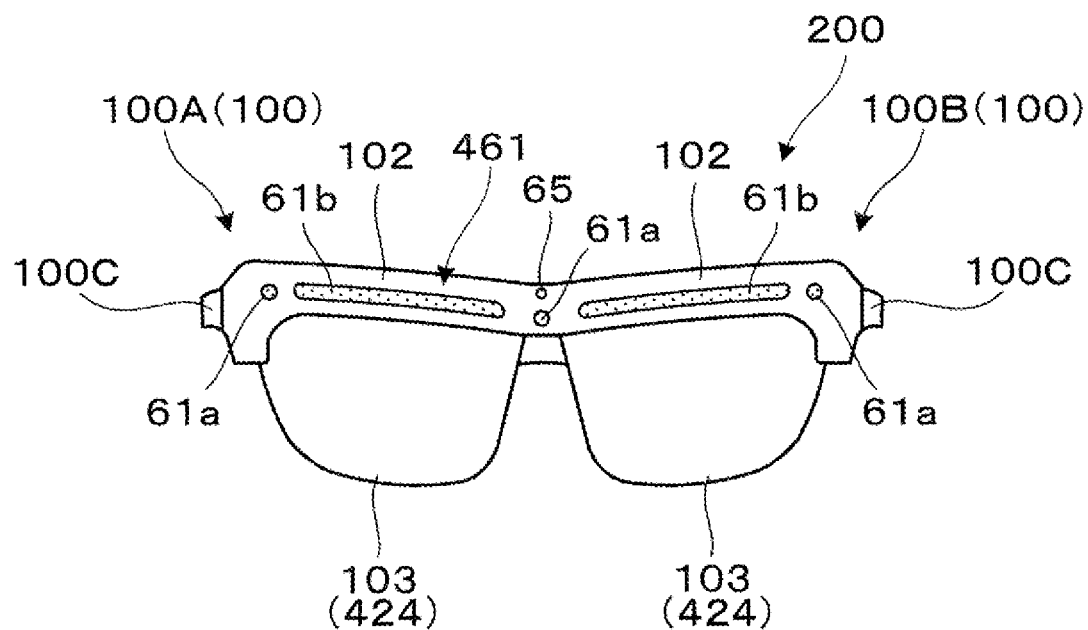
FIG. 10B is a front view for describing a virtual image display device.

FIG. 10A is a conceptual side sectional view for describing a light superimposing part 451 incorporated in the virtual image display device 100 of the fourth embodiment, and FIG. 10B is a front view of the virtual image display device 100 of the present embodiment.

In the virtual image display device 100 of the present embodiment, a concave transmissive mirror 424 includes the external light reflective film 324c as with the concave transmissive mirror 324 incorporated in the virtual image display device 100 of the third embodiment, and the external light reflective film 324c transmits the external light OL in the range outside the wavelength range of the image light ML, while efficiently reflecting the external light OL in the wavelength range of the image light ML. It should be noted that an outer surface 424f of the concave transmissive mirror 424 is an optical surface that does not include the scattering structure 24p. The light superimposing part 451 includes a plurality of light sources 461 that emits the illuminating light IL as the additional light AL3 to the external side or the front surface side of the concave transmissive mirror 424 or the optical element 105. The plurality of light sources 461 is fixed to an outer frame 102d of the display driving part 102 in an embedded manner. That is, light source 461 is disposed on the outside of the outer periphery of the concave transmissive mirror 424, for example. The plurality of light sources 461 includes a dotted light-emitting element 61a disposed at the left and right ends and/or the center of the display driving part 102, and a linear light-emitting element 61b extended in the lateral direction along the display driving part 102.

The light-emitting elements 61a and 61b, which are elements including optical devices such as a lens and a diffraction device, can set the emission direction and spread angle of the illuminating light IL to desired states, and can emit the illuminating light IL in an overlapping manner in the same front direction as the leaked light LE of the image light ML.

The external light sensor 65 measures the external light that is incident from the front side of the virtual image display device 100, and, when the output of the external light sensor 65 indicates a reduction in the intensity of the external light OL, the display control circuit 13 turns on the plurality of light sources 461 such that the additional light AL3 is emitted to the front side of the concave transmissive mirror 424. On the other hand, the external light reflective film 324c of the concave transmissive mirror 424 efficiently reflects the external light OL in the wavelength range of the image light ML such that the additional light AL is emitted to the external side of the concave transmissive mirror 424. In this manner, the additional light AL resulting from the passive external light OL and the active additional light AL3 corresponding to the output of the external light sensor 65 can be superimposed on the leaked light LE, and thus the recognition of the image light ML from the external side can be avoided.

It is to be noted that the concave transmissive mirror 424 includes the external light reflective film 324c, and has a function of passively superimposing the additional light AL of the visible range on the image light ML transmitted through the concave transmissive mirror 424 by itself as the light superimposing part 451.

Figure 11:
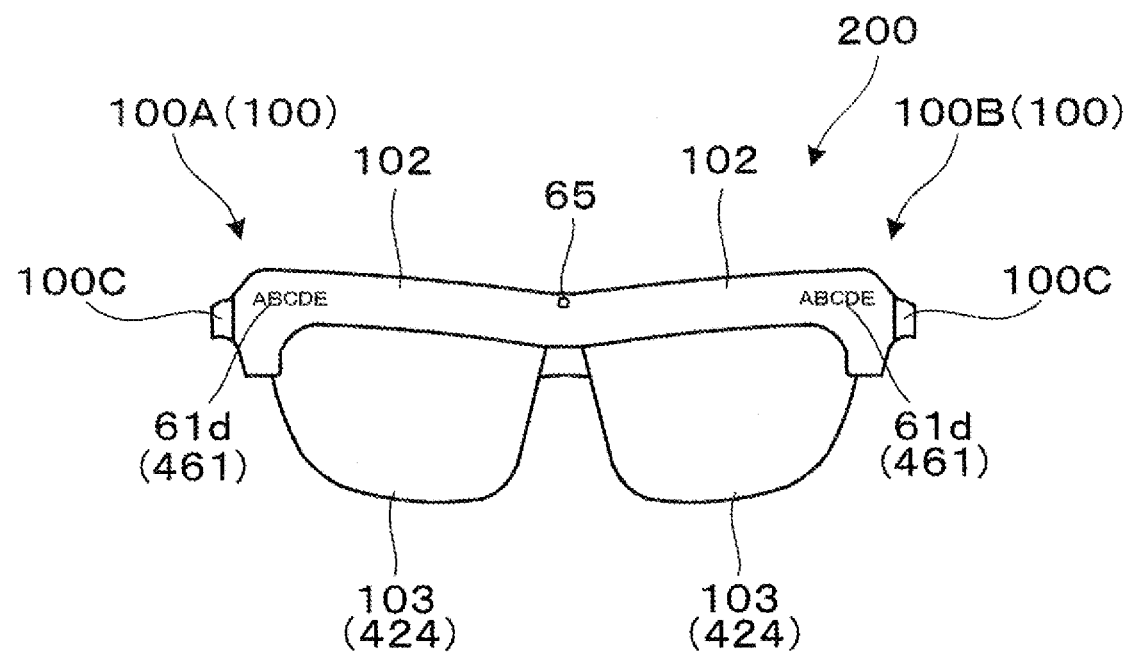
FIG. 11 is a front view for describing a device of a modification.

FIG. 11 illustrates a modification of the light-emitting elements 61a and 61b illustrated in FIG. 10B. A light-emitting element 61d illustrated in FIG. 11 emits light in a pattern composed of letters and/or diagrams. The pattern of the light-emitting element 61d may be a product name, a name representing a company name, a trademark, or the like.

Although descriptions are omitted above, a generally used light reducing shade element may be disposed on the outside or external side of the concave transmissive mirror 424. In this case, a cutout or a light transmission region may be provided in the light reducing shade element so that the additional light AL3 from the light-emitting elements 61a and 61b is not blocked. Further, the external light reflective film 324c may not have a special wavelength property as the partial reflective film 24b provided in the concave transmissive mirror 24 of the first embodiment.

Fifth Embodiment

A virtual image display device of a fifth embodiment is described below. The virtual image display device and the like of the fifth embodiment are obtained by partially changing the virtual image display device of the first embodiment, and therefore the description for the common portions is omitted.

Figure 12:
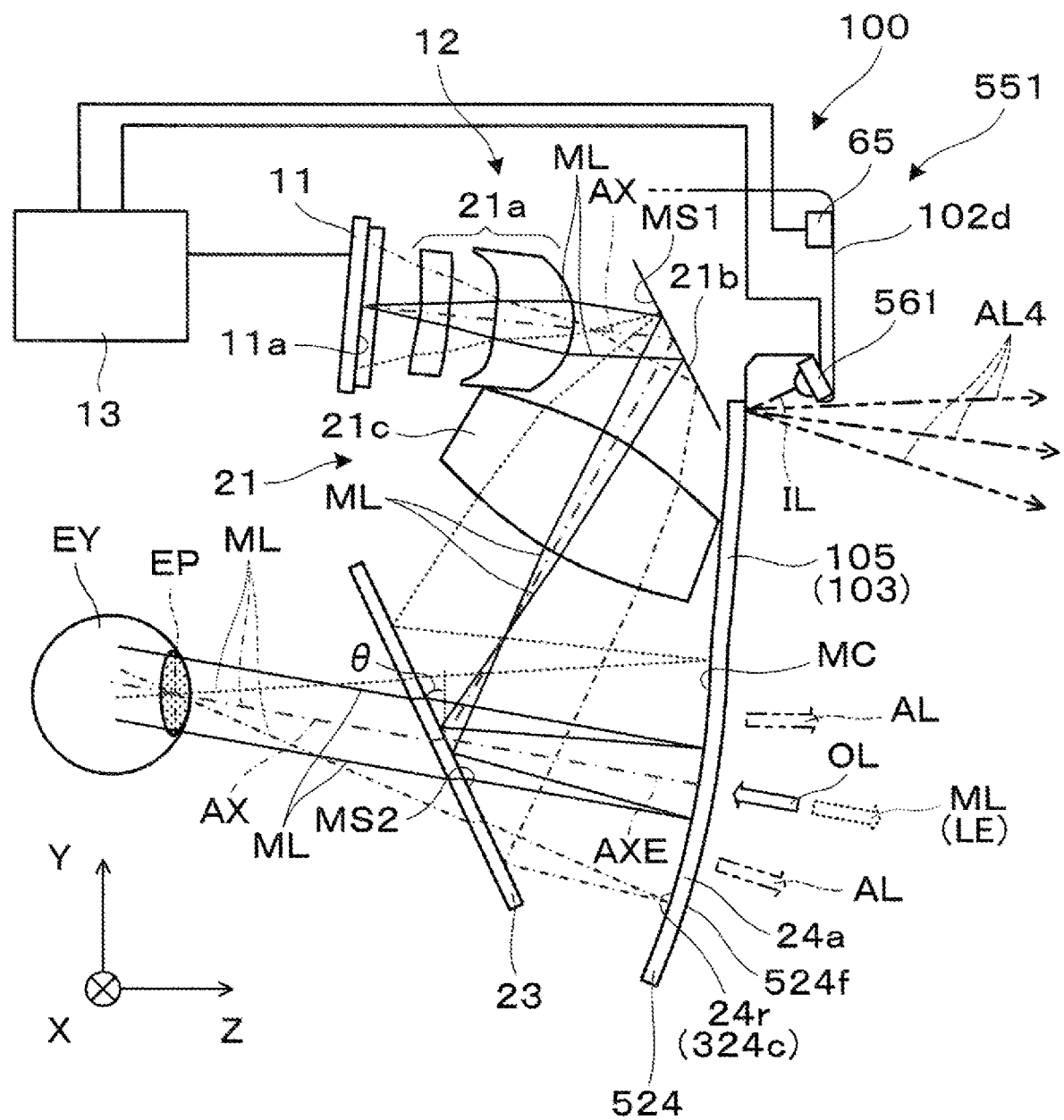
FIG. 12 is a conceptual side sectional view for describing a fifth embodiment.

FIG. 12 is a conceptual side sectional view for describing a light superimposing part 551 incorporated in the virtual image display device 100 of the fifth embodiment.

In the virtual image display device 100 of the present embodiment, a concave transmissive mirror 524 includes the external light reflective film 324c as with the concave transmissive mirror 324 incorporated in the virtual image display device 100 of the third embodiment, and the external light reflective film 324c transmits the external light OL in the range outside the wavelength range of the image light ML, while efficiently reflecting the external light OL in the wavelength range of the image light ML. It should be noted that an outer surface 524f of the concave transmissive mirror 524 is an optical surface that does not include the scattering structure 24p. The light superimposing part 551 includes a light source 561 that emits the illuminating light IL toward the outer surface 524f, which is the surface of the concave transmissive mirror 524. The light source 561 is fixed to a lower portion of the outer frame 102d of the display driving part 102.

The light source 561, which is a member including an optical device such as a lens and a diffraction device, can set the emission direction and spread angle of the illuminating light IL to desired states, and can emit the illuminating light IL at a predetermined angle toward the surface of the concave transmissive mirror 524. The outer surface 524f of the concave transmissive mirror 524 reflects, in the front direction of the concave transmissive mirror 524, the illuminating light IL emitted from the light source 561.

The external light sensor 65 measures the external light that is incident from the front side of the virtual image display device 100, and, when the output of the external light sensor 65 indicates a reduction in the intensity of the external light OL, the display control circuit 13 turns on the light source 561 such that the illuminating light IL is emitted toward the upper part of the concave transmissive mirror 524, and that the additional light AL4, which is the illuminating light IL reflected by the concave transmissive mirror 524, is emitted in the external direction or forward direction corresponding to the direction of the leaked light LE of the image light ML. On the other hand, the external light reflective film 324c of the concave transmissive mirror 524 efficiently reflects the external light OL in the wavelength range of the image light ML such that the additional light AL is emitted to the external side of the concave transmissive mirror 524. In this manner, the additional light AL resulting from the passive external light OL and the active additional light AL4 corresponding to the output of the external light sensor 65 can be superimposed on the leaked light LE, and thus the recognition of the image light ML from the external side can be avoided.

It is to be noted that the concave transmissive mirror 524 includes the outer surface 524f and the external light reflective film 324c, and has a function of passively superimposing the additional light AL of the visible range on the image light ML transmitted through the concave transmissive mirror 524 by itself as the light superimposing part 551. The light superimposing part 551 forms the additional light AL4 with the light source 561 combined with a superimposing member such as the concave transmissive mirror 524 or the outer surface 524f, and in this specification, the light superimposing part 551 combined with a light source is referred to also as a light superimposer.

Although descriptions are omitted above, a light reducing shade element may be disposed on the outside or external side of the concave transmissive mirror 524. In this case, by causing the illuminating light IL from the light source 561 to impinge on the light reducing shade element, the surface reflection light at the light reducing shade element can be utilized as the additional light AL4.

Sixth Embodiment

A virtual image display device of a sixth embodiment is described below. The virtual image display device and the like of the sixth embodiment are obtained by partially changing the virtual image display device of the first embodiment, and therefore the description for the common portions is omitted.

Figure 13:
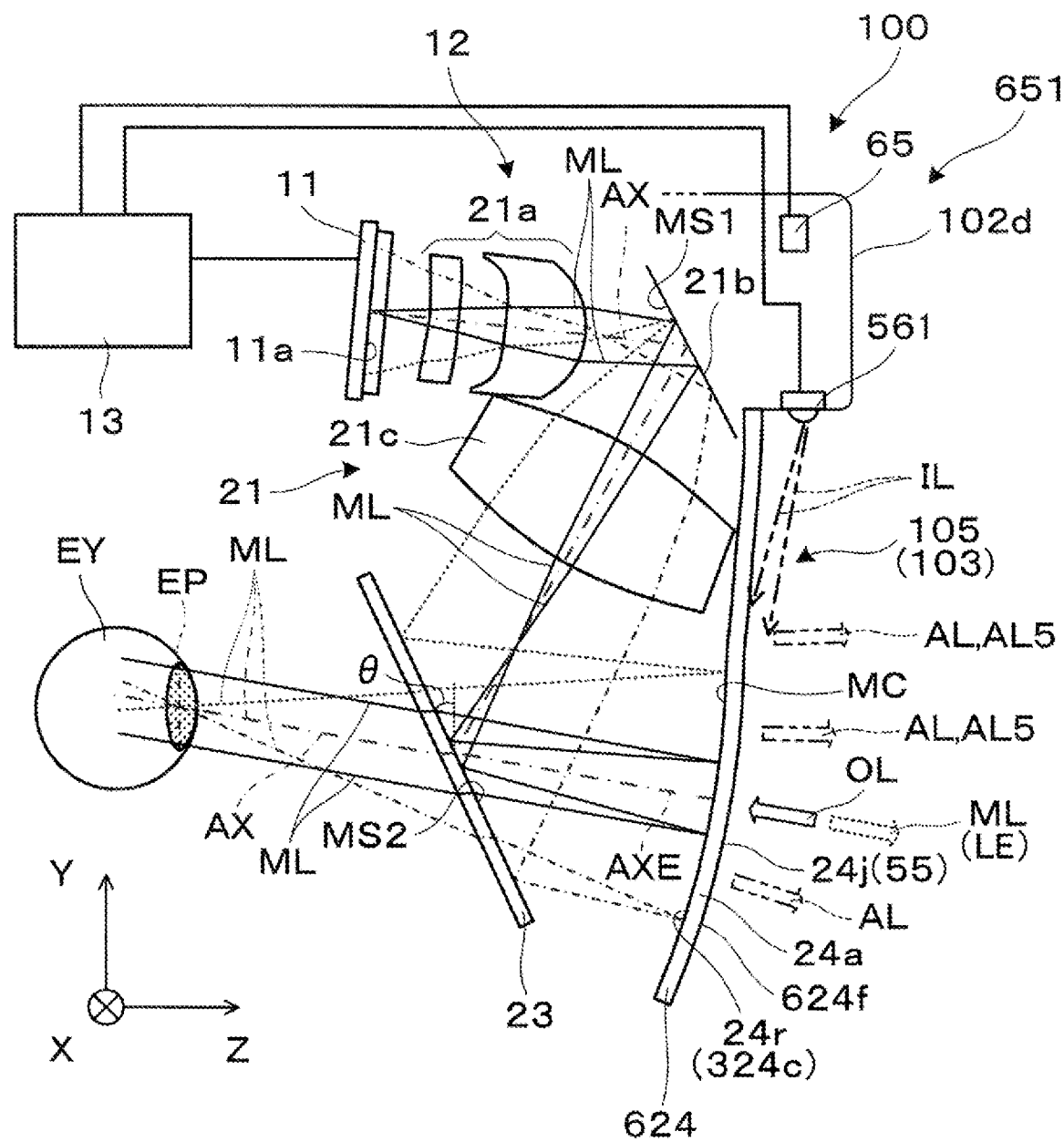
FIG. 13 is a conceptual side sectional view for describing a sixth embodiment.

FIG. 13 is a conceptual side sectional view for describing a light superimposing part 651 incorporated in the virtual image display device 100 of the sixth embodiment.

In the virtual image display device 100 of the present embodiment, a concave transmissive mirror 624 includes the external light reflective film 324c as with the concave transmissive mirror 324 incorporated in the virtual image display device 100 of the third embodiment. Further, a deflection film 24j serving as a deflector 55 is formed on an outer surface 624f of the concave transmissive mirror 624. The deflection film 24j is, for example, a reflective hologram, and reflects incident light in a direction out of a specular reflection direction. The light superimposing part 651 is composed of the light source 561 that emits the illuminating light IL toward the concave transmissive mirror 624, and the deflection film 24j provided in the concave transmissive mirror 624. The light source 561 is fixed to a lower portion of the outer frame 102d of the display driving part 102, and emits the illuminating light IL toward the deflection film 24j provided at the surface of the concave transmissive mirror 624. The deflection film 24j of the concave transmissive mirror 624 reflects, in the front direction of the concave transmissive mirror 624, the illuminating light IL emitted from the light source 561.

The external light sensor 65 measures the external light that is incident from the front side of the virtual image display device 100, and, when the output of the external light sensor 65 indicates a reduction in the intensity of the external light OL, the display control circuit 13 turns on the light source 561 such that the illuminating light IL is emitted toward the concave transmissive mirror 624, and that the additional light AL5, which is the illuminating light IL reflected by the concave transmissive mirror 624, is emitted in the forward direction or the external direction corresponding to the direction of the leaked light LE the image light ML. On the other hand, the external light reflective film 324c of the concave transmissive mirror 624 efficiently reflects the external light OL in the wavelength range of the image light ML such that the additional light AL is emitted to the external side of the concave transmissive mirror 624. In this manner, the additional light AL resulting from the passive external light OL and the active additional light AL5 corresponding to the output of the external light sensor 65 can be superimposed on the leaked light LE, and thus the recognition of the image light ML from the external side can be avoided. In this case, the emission position of the leaked light LE and the emission position of the additional light AL5 can be easily brought close to each other.

It is to be noted that the concave transmissive mirror 624 includes the outer surface 624f and the external light reflective film 324c, and has a function of passively superimposing the additional light AL of the visible range on the image light ML transmitted through the concave transmissive mirror 624 by itself as the light superimposing part 651. The light superimposing part 651 forms the additional light AL4 with the light source 561 combined with a superimposing member such as the concave transmissive mirror 624 or the outer surface 624f, and in this specification, the light superimposing part 651 combined with a light source is referred to also as a light superimposer.

In the virtual image display device 100 of the present embodiment, the light source 561 may be omitted. An external light source such as the sun and an illuminator may be utilized in place of the light source 561. The external light source is disposed above the virtual image display device 100 in many cases, and the deflection film 24j of the concave transmissive mirror 624 reflects, in the front direction of the concave transmissive mirror 624, the illuminating light IL emitted from the external light source, as the additional light AL5. In this case, the concave transmissive mirror 624 independently functions as the light superimposing part 651.

Although descriptions are omitted above, a light reducing shade element may be disposed on the outside or external side of the concave transmissive mirror 624. In this case, by forming the deflection film 24j on the surface of the shade element and causing the illuminating light IL from the light source 561 and/or the external light source to impinge on the shade element, the reflection light at the deflection film 24j provided in the shade element can be utilized as the additional light AL5. Further, in the concave transmissive mirror 324, the external light reflective film 324c may not have a special wavelength property as the partial reflective film 24b provided in the concave transmissive mirror 24 of the first embodiment.

Seventh Embodiment

A virtual image display device of a seventh embodiment is described below. The virtual image display device and the like of the seventh embodiment are obtained by partially changing the virtual image display device of the first embodiment, and therefore the description for the common portions is omitted.

Figure 14:
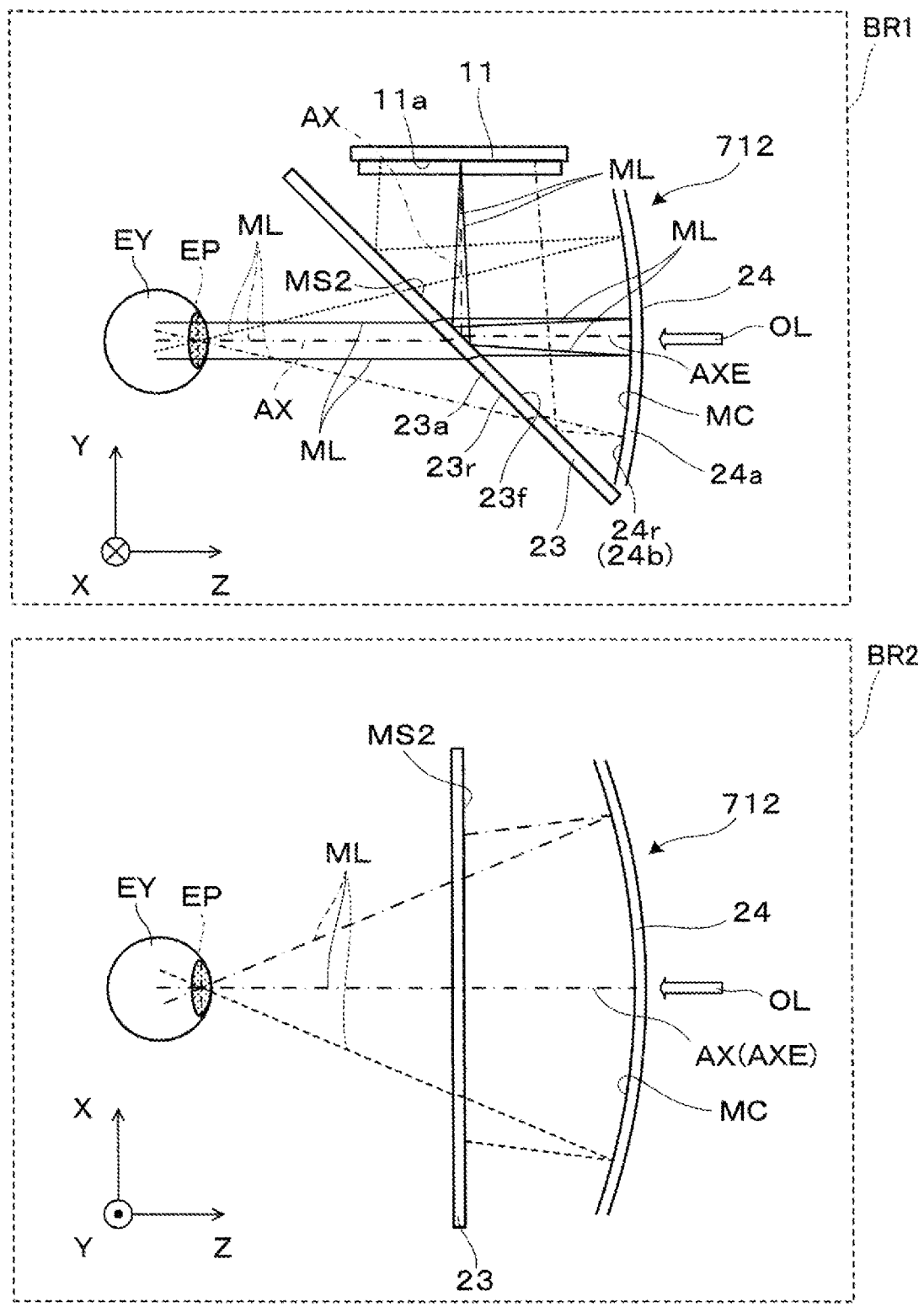
FIG. 14 is a conceptual side sectional view and a partial sectional plan view for describing a seventh embodiment.
Figure 15:
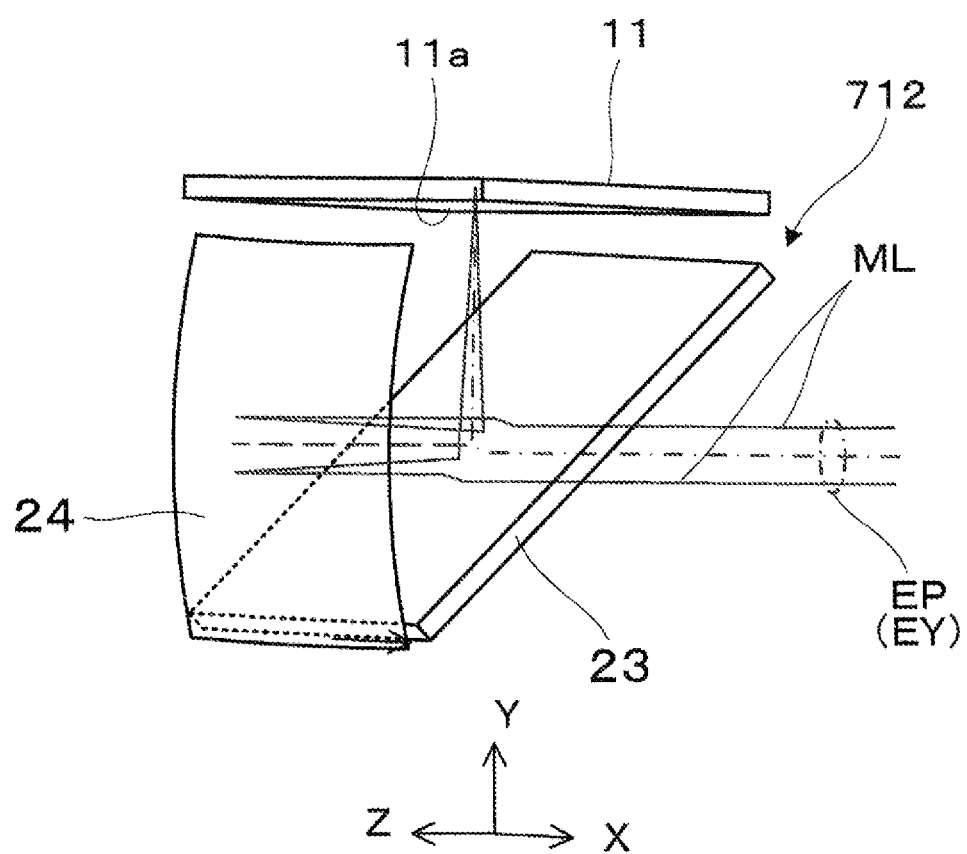
FIG. 15 is a schematic perspective view for describing the virtual image display device of FIG. 14.

With reference to FIG. 14 and FIG. 15, the virtual image display device of the seventh embodiment is described below. In FIG. 14, a first region BR1 is a side sectional view of an optical unit 712 in the seventh embodiment, and a second region BR2 is a plan view illustrating a partial cross section along light paths of the optical unit 712. FIG. 15 is a schematic perspective view for describing a structure of the optical unit 712 of the seventh embodiment.

The optical unit 712 includes the transmissive tilted mirror 23 and the concave transmissive mirror 24. That is, the optical unit 712 of the seventh embodiment causes the image light ML to impinge on the concave transmissive mirror 24 without forming an intermediate image.

Regarding the light path, the image light ML from the image generation part 11 impinges on the transmissive tilted mirror 23. The image light ML reflected by the transmissive tilted mirror 23 by, for example, approximately 50% impinges on the concave transmissive mirror 24, and is then reflected by the partial reflective surface MC with a reflectance of approximately 50%. The image light ML reflected by the concave transmissive mirror 24 impinges on the exit pupil EP where the eye EY or pupil hole of the wearer US is located. The external light OL passed through the concave transmissive mirror 24 also impinges on the exit pupil EP. That is, the wearer US wearing the HMD 200 can observe a virtual image of the image light ML superimposed on external images.

The shade elements 27 and 227 illustrated in FIGS. 2 and 6A and the like are disposed on the external side of the optical unit 712. Alternatively, the concave transmissive mirror 24 illustrated in FIG. 14 may be replaced by the concave transmissive mirror 324 and the light superimposing part 251 illustrated in FIG. 8 and the like. The virtual image display device of the seventh embodiment may also incorporate the light superimposing parts 451, 551 and 651 illustrated in FIGS. 10A, 12 and 13.

Eighth Embodiment

A virtual image display device of an eighth embodiment is described below. The virtual image display device and the like of the eighth embodiment are obtained by partially changing the virtual image display device of the first embodiment, and therefore the description for the common portions is omitted.

Figure 16:
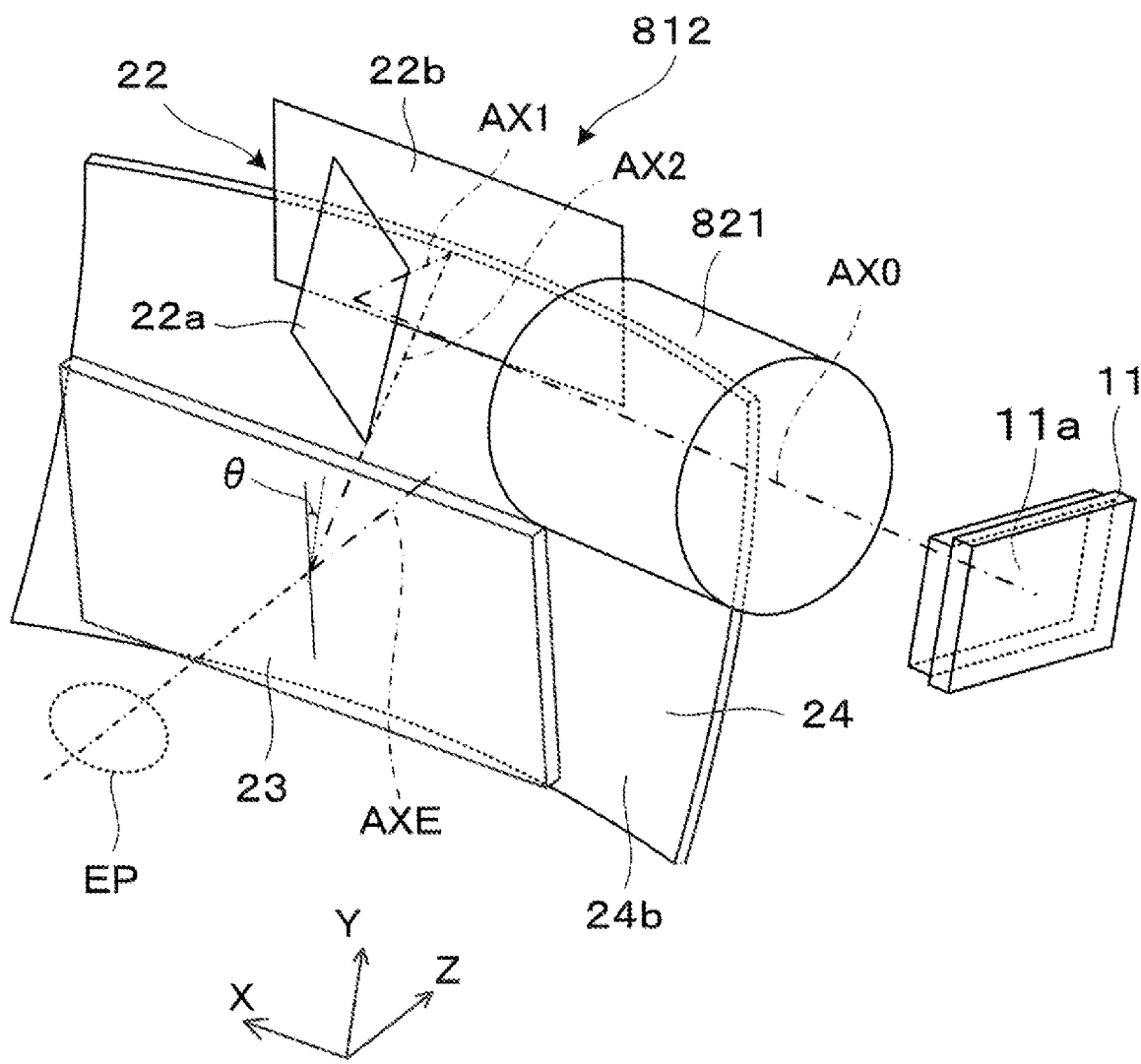
FIG. 16 is a schematic perspective view for describing a structure of a virtual image display device of an eighth embodiment.

With reference to FIG. 16, the virtual image display device of the eighth embodiment is described below. An optical unit 812 includes a projection optical system 821, a bending reflection mirror 22, the transmissive tilted mirror 23 and the concave transmissive mirror 24. Specifically, the bending reflection mirror 22 is disposed between the projection optical system 821 and the transmissive tilted mirror 23.

The bending reflection mirror 22 includes a first mirror 22a and a second mirror 22b in the order of the light path from the image generation part 11. The bending reflection mirror 22 reflects, in the intersection direction, the image light ML from the projection optical system 821. The transmissive tilted mirror 23 is disposed on the light emission side of the second mirror 22b. A projection optical axis AX0 as the optical axis of the projection optical system 821 extends in parallel with the lateral X-axis direction. The first mirror 22a bends the light path from the projection optical axis AX0 along a reflection optical axis AX1, and the second mirror 22b bends the light path from the reflection optical axis AX1 along a reflection optical axis AX2. As a result, the optical axis approximately horizontally extended on the emission side of the projection optical system 821 nearly vertically extends on the incident side of the transmissive tilted mirror 23.

With respect to the XY plane extending in the vertical direction, the transmissive tilted mirror 23 is tilted at an angle θ=approximately 20 to 40° in the counterclockwise direction around the X axis as viewed from the −X side. The light path from the image generation part 11 to the bending reflection mirror 22 is disposed on the upper side of the transmissive tilted mirror 23. More specifically, the image generation part 11, the projection optical system 821, and the bending reflection mirror 22 are disposed in a space sandwiched between a tilted plane extended from the transmissive tilted mirror 23 and a vertical plane extended upward from the upper end of the concave transmissive mirror 24.

In the optical unit 812, the cross-sectional structure of the concave transmissive mirror 24 is the same as those illustrated in FIGS. 4 and 7 and the like. In addition, the shade element 27 and the like illustrated in FIG. 2 can be detachably disposed on the external side of the concave transmissive mirror 24. The virtual image display device of the eighth embodiment may also incorporate the light superimposing parts 451, 551 and 651 illustrated in FIGS. 10A, 12 and 13.

In the virtual image display device 100 of the eighth embodiment described above, it is possible to easily prevent the image generation part 11 and associated optical elements from largely protruding upward and rearward of the transmissive tilted mirror 23, and the virtual image display device 100 can be downsized, thus achieving a slender exterior appearance.

Ninth Embodiment

A virtual image display device of a ninth embodiment is described below. The virtual image display device and the like of the ninth embodiment are obtained by partially changing the virtual image display device of the first embodiment, and therefore the description for the common portions is omitted.

Figure 17:
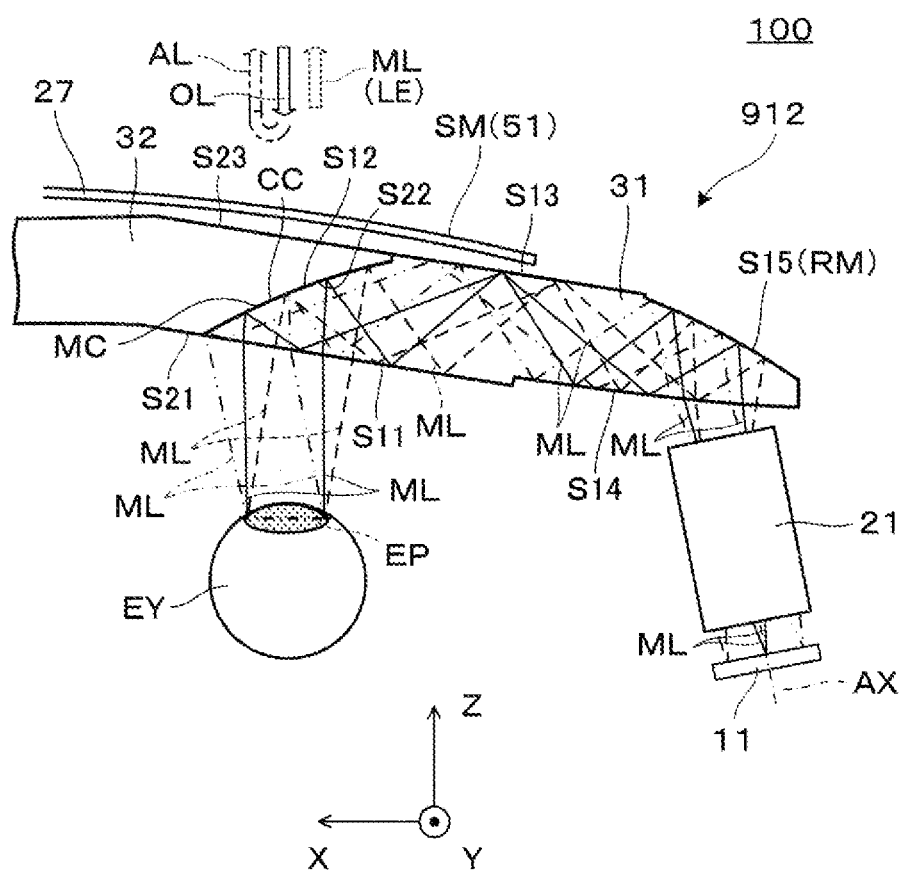
FIG. 17 is a planer sectional view for describing a virtual image display device of a ninth embodiment.

As illustrated in FIG. 17, an optical unit 912 includes a light guide in which a light guiding member 31 and a light transmitting member 32 are joined together with a bonding layer CC therebetween. The light guiding member 31 and the light transmitting member 32 are formed of a resin material with high light transparency in the visible range. The light guiding member 31 includes first to fifth surfaces S11 to S15. The first and third surfaces S11 and S13 are flat surfaces that are parallel to each other, and the second, fourth, and fifth surfaces S12, S14 and S15 are convex optical surfaces in their entirety, which are composed of free curved surfaces, for example. The light transmitting member 32 includes first to third transmission surfaces S21 to S23. The first and third transmission surfaces S21 and S23 are flat surfaces that are parallel to each other, and the second transmission surface S22 is a concave optical surface in its entirety, which is composed of a free curved surface, for example. The second surface S12 of the light guiding member 31 and the second transmission surface S22 of the light transmitting member 32 have equivalent inverted concavo-convex shapes, and the partial reflective surface MC composed of a partial reflective film is formed on one surface of each member. The partial reflective surface MC protrudes to the external side.

An overview of the light path of the image light ML is described below. The light guiding member 31 guides, toward the eye of the viewer, the image light ML emitted from the projection optical system 21 through the reflection at first to fifth surfaces S11 to S15, and the like. More specifically, first, the image light ML from the projection optical system 21 impinges on the fourth surface S14 so as to be reflected by the fifth surface S15 as the inner surface of a reflective film RM, again impinges on the fourth surface S14 from the inside so as to be totally reflected, impinges on the third surface S13 so as to be totally reflected, and then impinges on the first surface S11 so as to be totally reflected. The image light ML totally reflected by the first surface S11 impinges on the second surface S12, and is partially reflected by the partial reflective surface MC, i.e., a partial reflective film, provided in the second surface S12 while being partially transmitted through it, and then, the light again impinges on the first surface S11 so as to pass through it. The image light ML passed through the first surface S11 impinges on the exit pupil EP where the eye of the viewer is located, as an approximately parallel light batch. That is, the viewer observes an image with the image light ML as a virtual image.

The optical unit 912 enables visual recognition of the image light ML for the viewer with the light guiding member 31, and the observation of an external image with less distortion for the viewer in the state where the light guiding member 31 and the light transmitting member 32 are combined together. At this time, since the third surface S13 and first surface S11 is composed of flat surfaces that are approximately parallel with each other (visibility: substantially 0), almost no aberration or the like of the external light OL is caused. In addition, the third transmission surface S23 and the first transmission surface S21 are flat surfaces that are approximately parallel with each other. Further, since the third transmission surface S23 and the first surface S11 are flat surfaces that are approximately parallel with each other, almost no aberration or the like is caused. Thus, the viewer observes an external image with no distortion through the light transmitting member 32.

The shade element 27 is similar to that incorporated in the virtual image display device of the first embodiment, and includes an external light reflective film with a high reflectance in the wavelength range corresponding to RGB included in the image light ML incident from the direction of the exit pupil EP where the eye is located, and a relatively low reflectance in the wavelength range between RGB or outside RGB included in the external light OL incident from the direction opposite to the exit pupil EP. The partial reflective surface MC is not limited to a surface with a uniform reflectance in the entire visible wavelength range, and may have a wavelength property as with the external light reflective film 27c or the external light reflective film 324c.

The virtual image display device of the ninth embodiment may incorporate the light superimposing part 451 illustrated in FIG. 10A of the fourth embodiment, and may incorporate the light superimposing parts 551 and 651 illustrated in FIG. 12 and FIG. 13 of the fifth embodiment and the sixth embodiment.

Tenth Embodiment

A virtual image display device of a tenth embodiment is described below. The virtual image display device and the like of the tenth embodiment are obtained by partially changing the virtual image display device of the first embodiment, and therefore the description for the common portions is omitted.

Figure 18A:
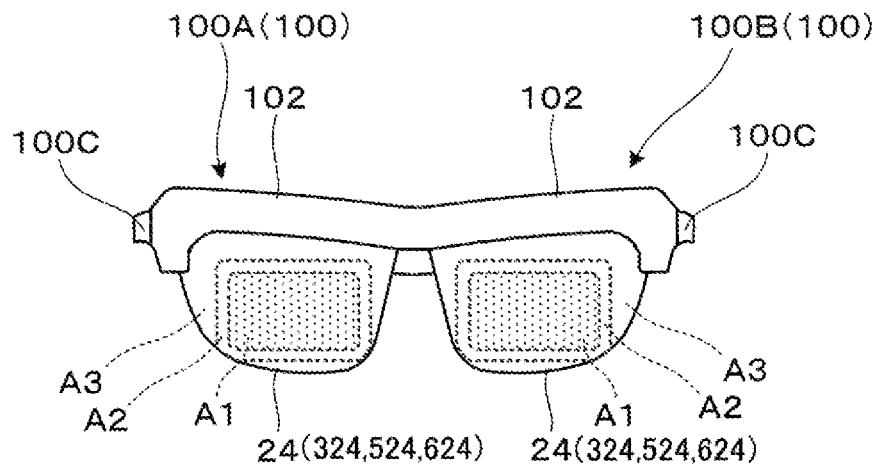
FIG. 18A is a front view for describing a virtual image display device of a tenth embodiment.

With reference to FIG. 18A, in the present embodiment, in the concave transmissive mirrors 24, 324, 424, 524 and 624, the partial reflective surface MC may be formed in a region A1 corresponding to the effective region facing the transmissive tilted mirror 23. In peripheral regions A2 and A3 around the region A1, a reflectance transition region whose reflectance of the image light ML gradually decreases with respect to the partial reflective surface MC may be formed, while the partial reflective surface MC may be formed. It is to be noted that, for example, in the case where the emission light axis AXE of the concave transmissive mirrors 24, 324, 424, 524 and 624 is set at approximately 10° downward with respect to the forward +Z direction, the region A1 and the like facing the transmissive tilted mirror 23 in the concave transmissive mirrors 24, 324, 424, 524 and 624 are configured in consideration of such an inclination of the optical axis AXE. That is, the region A1 faces the transmissive tilted mirror 23 with respect to the eye direction.

Figure 18B:
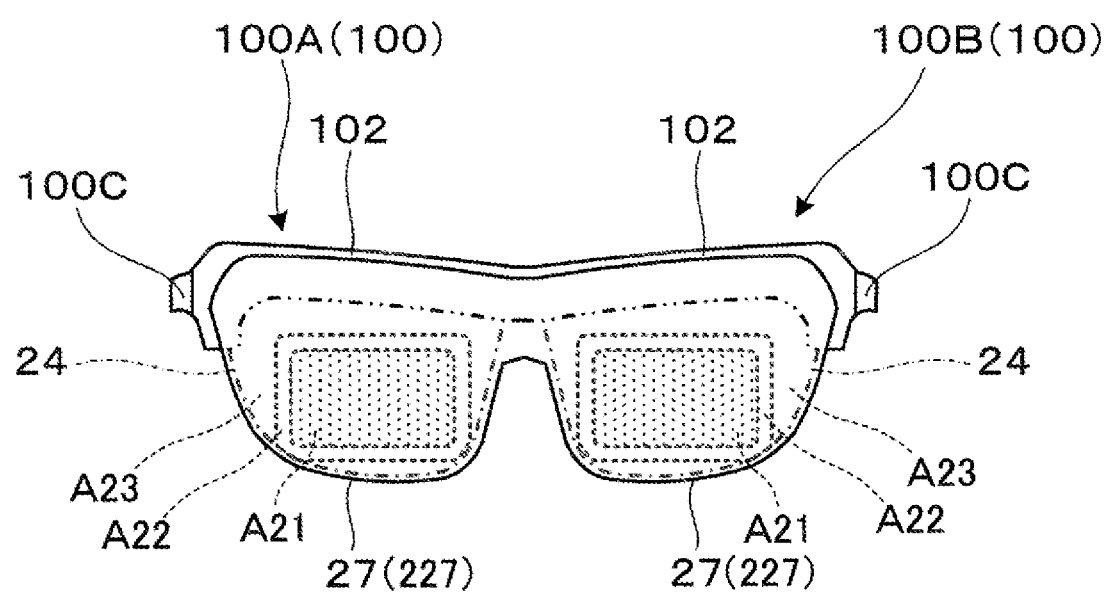
FIG. 18B is a front view for describing the virtual image display device of the tenth embodiment.

With reference to FIG. 18B, in the shade elements 27 and 227, the partial reflective surface SM may be formed in a region A21 corresponding to the effective region that faces the transmissive tilted mirror 23 through the concave transmissive mirror 24. In peripheral regions A22 and A23 around the region A21, a reflectance transition region whose reflectance of the image light ML gradually decreases with respect to the partial reflective surface SM may be formed, while the partial reflective surface SM may be formed. That is, the light superimposing part 51 may be formed in the region A21 in the shade elements 27 and 227, and may be further extended to the peripheral regions A22 and A23. With the light superimposing part 51 formed in local regions such as the region A21 and the peripheral region A22, or in the entire region including the regions A21, A22 and A23, the visibility from the outside of the image light ML can be suppressed by superimposing external light on leaked light from a part of the image light emission region (corresponding to the regions A1 and A21) such as the transmissive tilted mirror 23 and the shade elements 27 and 227. It is to be noted that for example, in the case where the emission light axis AXE of the concave transmissive mirror 24 is set at approximately 10° downward with respect to the forward +Z direction, the region A21 and the like facing the transmissive tilted mirror 23 through the concave transmissive mirror 24 in the shade element 27 are configured in consideration of such an inclination of the optical axis AXE. That is, the region A21 faces the transmissive tilted mirror 23 with respect to the eye direction.

Eleventh Embodiment

A virtual image display device of an eleventh embodiment is described below. The virtual image display device and the like of the eleventh embodiment are obtained by partially changing the virtual image display device of the first embodiment, and therefore the description for the common portions is omitted.

Figure 19:
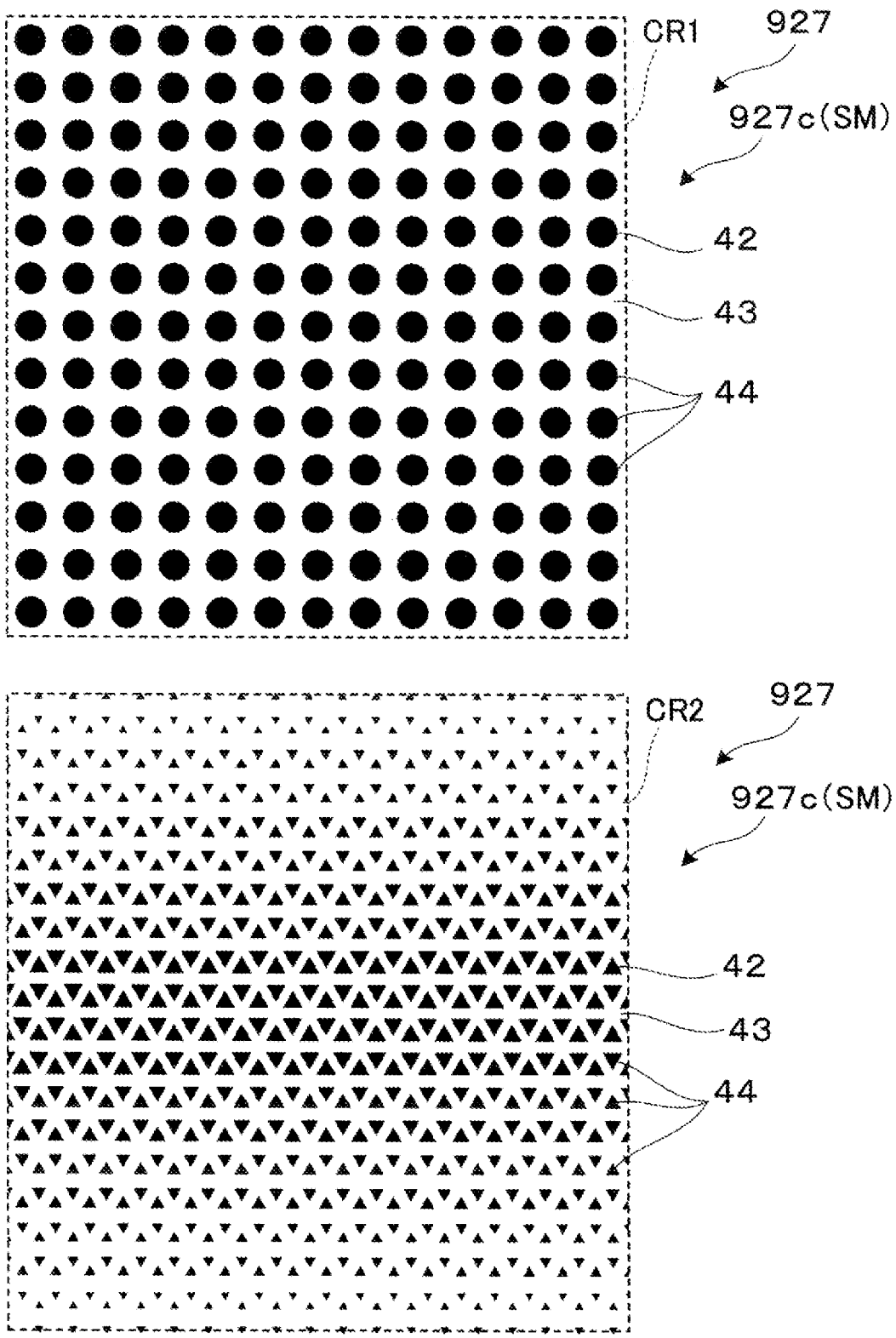
FIG. 19 is an enlarged front view for describing a virtual image display device of an eleventh embodiment.
Figure 20:
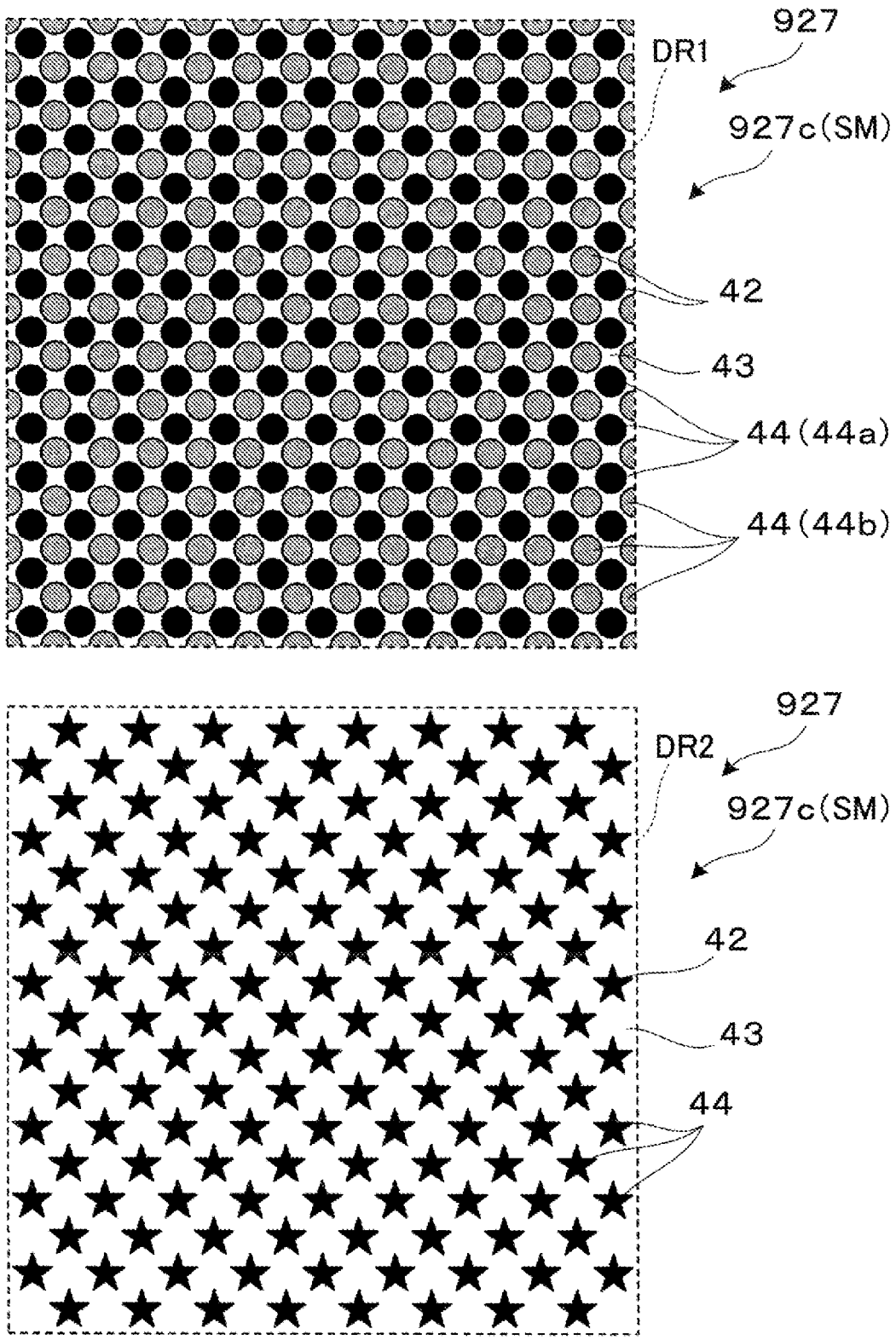
FIG. 20 is an enlarged front view for describing the virtual image display device of the eleventh embodiment.

FIG. 19 and FIG. 20 are enlarged front views for describing a shade element 927 incorporated in the virtual image display device of eleventh embodiment. In FIG. 19, a first region CR1 is an enlarged front view of an external light reflection layer 927c of the shade element 927, and a second region CR2 is an enlarged front view of the external light reflection layer 927c of a first modification. In FIG. 20, a first region DR1 is an enlarged front view of the external light reflection layer 927c of a third modification, and a second region DR2 is an enlarged front view of the external light reflection layer 927c of a fourth modification. It is to be noted that the external light reflection layer 927c may be formed not only on the external side of the shade element 927, but also on the inside of the shade element 927.

The external light reflection layer 927c illustrated in the first region CR1 of FIG. 19 is the partial reflective surface SM including a reflection region 42 and a transmission region 43. The transmission region 43 can transmit substantially 100% of incident light. The reflection region 42 includes a plurality of pattern elements 44 two-dimensionally arranged on grid points. The drawing illustrates a part of the external light reflection layer 927c, and the same pattern is spread in the periphery region. In the circular pattern corresponding to the pattern elements 44, the center of the circle is arranged on the grid point. The size of the pattern element 44 is approximately several hundred micrometers to 3 mm, preferably approximately several hundred micrometers to 2 mm. The pattern elements 44 are arranged in a density that does not cause diffraction. The pattern elements 44 can be arranged with regularity as in the example illustrated in the drawing, but it is more desirable that the pattern elements 44 be arranged at random with no regularity. Each pattern element 44 has the same structure and function as those of the external light reflective film 27c of the first embodiment, and the reflection property of each pattern element 44 has a high reflectance in the wavelength range corresponding to RGB and a relatively low reflectance in the wavelength range between RGB or outside RGB.

In the first modification illustrated in the second region CR2, in the triangular pattern corresponding to the pattern elements 44 constituting the external light reflection layer 927c, the center of gravity of the triangular is arranged on the grid point, and the area of the triangular gradually decreases in the direction away from the center of the concave transmissive mirror 24 in the vertical direction in the drawing, i.e., in the Y direction or the vertical direction in of FIG. 2.

In the second modification illustrated in the first region DR1 of FIG. 20, the circular pattern corresponding to the pattern elements 44 constituting the external light reflection layer 927c is more densely arranged than the external light reflection layer 927c illustrated in the first region CR1 of FIG. 19. In addition, a light shield pattern layer 41 includes the pattern elements 44 with different reflectances. For example, the pattern elements 44 includes pattern elements 44a with a reflectance of 100% for the target wavelength and pattern elements 44b with a reflectance of 50% for the target wavelength, and lines of the pattern elements 44a and lines of the pattern elements 44b are alternately arranged in the light shield pattern layer 41.

In the third modification illustrated in the second region DR2, in the star pattern corresponding to the pattern elements 44 constituting the external light reflection layer 927c, the center of gravity of the star shape is arranged on the grid point.

Modification and so Forth

The present disclosure is described according to the above-mentioned exemplary embodiments, but the present disclosure is not limited to the above-mentioned exemplary embodiments. The present disclosure may be carried out in various modes without departing from the gist of the present disclosure, and, for example, the following modifications may be carried out.

While the virtual image display device 100 of the above-mentioned embodiments uses a self-emitting display device such as a micro LED display, and LCD and other light modulation elements as the image generation part 11, it is also possible to adopt a configuration using a laser scanner including a combination of a laser light source and a scanner such as a polygon mirror, in place of the above-mentioned configuration. That is, the present disclosure is applicable to a head-mounted display of a laser retinal projection type.

The plate-shaped members 24a and 27a that constitute the concave transmissive mirror 24 and the shade element 27 may be formed of not only a resin material, but also glass, synthetic quartz, or a composite material of them and a resin material.

The optical unit 12 may be an optical system including a light guide, a prism, a complex of a prism and a mirror, and the like in the preceding stage of the transmissive tilted mirror 23.

A virtual image display device in a specific aspect includes an image generation part, and a concave transmissive mirror configured to reflect image light emitted from the image generation part. A light superimposing part is provided on an external side of a partial reflective film provided in the concave transmissive mirror, the light superimposing part being configured to superimpose additional light in a visible range on image light transmitted through the partial reflective film.

In the virtual image display device, the light superimposing part provided on the external side of the partial reflective film provided in the concave transmissive mirror superimposes the additional light in the visible range on the image light transmitted through the partial reflective film, and thus the leaked light passed through concave transmissive mirror is hidden in the additional light and becomes less noticeable, and, the observation of a part of the image by third parties can be prevented.

In a specific aspect, the light superimposing part is an external light reflective film that has a peak value of a reflectance in a display wavelength region corresponding to the image light, and the peak value is greater than an average reflectance of an entire visible range. In this case, the additional light can be formed through the reflection of external light, and no special light source is required.

In another aspect, the light superimposing part includes an incident part configured to introduce light from a light source, and a light guiding part configured to guide the light introduced from the incident part and emit the light, in a front direction of the concave transmissive mirror, as the additional light. In this case, with the light source, the additional light can be compulsorily formed.

In still another aspect, the light superimposing part includes a light source configured to emit the additional light toward an external side of the concave transmissive mirror.

In still another aspect, the light superimposing part includes a light source disposed on an outside of an outer periphery of the concave transmissive mirror, and configured to emit the additional light in a front direction of the concave transmissive mirror.

In still another aspect, the light superimposing part includes a light source configured to emit light toward a surface of the concave transmissive mirror. In this case, the emission position of the leaked light and the emission position of the additional light can be easily brought close to each other.

In still another aspect, the light superimposing part includes the light source configured to emit light toward the surface of the concave transmissive mirror, and a deflector configured to reflect, to a front surface side as the additional light, light emitted from the light source.

In still another aspect, the light superimposing part is a reflective hologram provided at the surface of the concave transmissive mirror. In this case, the additional light is formed by reflecting, in the front direction of the concave transmissive mirror, illuminating light emitted from an external light source.

In still another aspect, the concave transmissive mirror reflects the image light to collect the image light into an exit pupil.

Still another aspect further includes a shade element separated away from the concave transmissive mirror on an external side of the concave transmissive mirror. The light superimposing part is incorporated in the shade element. The shade element can not only weaken the image light emitted to the external side, but also can actively form the additional light.

In still another aspect, the light superimposing part includes an incident part configured to introduce light from a light source, and a light guiding part configured to guide the light introduced from the incident part and emit, in a front direction of the concave transmissive mirror, the light introduced from the incident part as the additional light.

Still another aspect further includes a transmissive tilted mirror configured to reflect image light from the image generation part. The concave transmissive mirror reflects, toward the transmissive tilted mirror, image light reflected by the transmissive tilted mirror. In this case, the transmissive tilted mirror is disposed to cover the front side of the eye, and the concave transmissive mirror is disposed to cover the transmissive tilted mirror.

Still another aspect further includes a bending reflection mirror configured to reflect, in an intersection direction, the image light from the image generation part. In this case, it is possible to easily prevent the image generation part and associated optical elements from largely protruding upward and rearward of the transmissive tilted mirror, and the virtual image display device can be downsized, thus achieving a slender exterior appearance.

Still another aspect further includes a projection optical system disposed between the image generation part and the transmissive tilted mirror and configured to form an intermediate image. In this case, with the projection optical system, the image generation part can be downsized and the image quality can be increased.

In still another aspect, the image light is caused to impinge on the concave transmissive mirror without forming an intermediate image.

In still another aspect, in a region facing the transmissive tilted mirror in the concave transmissive mirror or a peripheral region, the light superimposing part superimposes the additional light on the image light transmitted through the partial reflective film.

An optical unit of a specific aspect includes a concave transmissive mirror configured to reflect image light. A light superimposing part is provided on an external side of a partial reflective film provided in the concave transmissive mirror, the light superimposing part being configured to superimpose additional light in a visible range on image light transmitted through the partial reflective film.

In the optical unit, the light superimposing part provided on the external side of the partial reflective film provided in the concave transmissive mirror superimposes the additional light in the visible range on the image light transmitted through the partial reflective film, and thus the leaked light passed through concave transmissive mirror is hidden in the additional light and becomes less noticeable, and, the observation of a part of the image by third parties can be prevented.

What is claimed is:

1. A virtual image display device comprising:
    an image generation device;
    a concave transmissive mirror configured to reflect image light emitted from the image generation device; and
    a shade element having a partial reflective surface at an external side of the shade element, and comprising a light superimposer provided on an external side of a partial reflective film provided at the concave transmissive mirror, wherein
    the light superimposer is an external light reflective film, external light incident from the external side of the shade element is reflected in a wavelength range of the image light and is emitted as additional light in an external direction of the shade element,
    the image light partially passed through the concave transmissive mirror impinges on an inside surface of the shade element,
    a first portion of the image light passed through the concave transmissive mirror is reflected by the external light reflective film, and a second portion of the image light passed through the concave transmissive mirror is emitted as leaked light in the external direction of the shade element, and
    the light superimposer is configured to superimpose the additional light in a visible range on the image light transmitted through the partial reflective film as the leaked light such that the leaked light is hidden in the additional light.

2. The virtual image display device according to claim 1, wherein the external light reflective film has a peak value of a reflectance in a display wavelength region corresponding to the image light, and the peak value is greater than an average reflectance of an entire visible range.

3. The virtual image display device according to claim 1, wherein the light superimposer includes an incident part configured to introduce light from a light source, and a light guiding part configured to guide the light introduced from the incident part and emit the light, as the additional light, in a front direction of the concave transmissive mirror.

4. The virtual image display device according to claim 1, wherein the light superimposer includes a light source configured to emit the additional light toward an external side of the concave transmissive mirror.

5. The virtual image display device according to claim 4, wherein the light superimposer includes a light source disposed on an outside of an outer periphery of the concave transmissive mirror, and configured to emit the additional light in a front direction of the concave transmissive mirror.

6. The virtual image display device according to claim 4, wherein the light superimposer includes a light source configured to emit light toward a surface of the concave transmissive mirror.

7. The virtual image display device according to claim 6, wherein the light superimposer includes the light source configured to emit light toward the surface of the concave transmissive mirror, and a deflector configured to reflect, to a front surface side, light emitted from the light source as the additional light.

8. The virtual image display device according to claim 7, wherein the light superimposer is a reflective hologram provided at the surface of the concave transmissive mirror.

9. The virtual image display device according to claim 1, wherein the concave transmissive mirror reflects the image light to collect the image light into an exit pupil.

10. The virtual image display device according to claim 1, comprising a shade element separated away from the concave transmissive mirror on an external side of the concave transmissive mirror, wherein the light superimposer is incorporated in the shade element.

11. The virtual image display device according to claim 10, wherein the light superimposer includes an incident part configured to introduce light from a light source, and a light guiding part configured to guide the light introduced from the incident part, and emit the light, as the additional light, in a front direction of the concave transmissive mirror.

12. The virtual image display device according to claim 1, comprising a transmissive tilted mirror configured to reflect image light from the image generation device, wherein the concave transmissive mirror reflects, toward the transmissive tilted mirror, image light reflected by the transmissive tilted mirror.

13. The virtual image display device according to claim 12, further comprising a bending reflection mirror configured to reflect, in an intersection direction, the image light from the image generation device.

14. The virtual image display device according to claim 12, further comprising a projection optical system disposed between the image generation device and the transmissive tilted mirror and configured to form an intermediate image.

15. The virtual image display device according to claim 12, wherein the image light is caused to impinge on the concave transmissive mirror without forming an intermediate image.

16. The virtual image display device according to claim 12, wherein in a region, facing the transmissive tilted mirror, in the concave transmissive mirror or a peripheral region, the light superimposer superimposes the additional light on the image light transmitted through the partial reflective film.

17. An optical unit comprising a concave transmissive mirror configured to reflect image light, wherein a light superimposer is provided on an external side of a partial reflective film provided in the concave transmissive mirror, the light superimposer being configured to superimpose additional light in a visible range on image light transmitted through the partial reflective film.

* * * * *